(12) United States Patent
Chen et al.

(10) Patent No.: US 8,792,492 B2
(45) Date of Patent: Jul. 29, 2014

(54) OPEN COMMUNICATION METHOD IN A HETEROGENEOUS NETWORK

(75) Inventors: Wai Chen, Basking Ridge, NJ (US); Ratul Guha, Kendall Park, NJ (US); John Lee, Howell, NJ (US); Junichiro Fukuyama, Union, NJ (US); Rama Vuyyuru, Somerset, NJ (US)

(73) Assignees: Telcordia Technologies, Inc., Piscataway, NJ (US); Toyota Infotechnology Center U.S.A., Inc., Palo Alto, CA (US)

( * ) Notice: Subject to any disclaimer, the term of this patent is extended or adjusted under 35 U.S.C. 154(b) by 366 days.

(21) Appl. No.: 13/275,057

(22) Filed: Oct. 17, 2011

(65) Prior Publication Data

US 2013/0094509 A1 Apr. 18, 2013

(51) Int. Cl.
*H04L 12/28* (2006.01)

(52) U.S. Cl.
USPC .......................................................... 370/392

(58) Field of Classification Search
None
See application file for complete search history.

(56) References Cited

U.S. PATENT DOCUMENTS

| | | | |
|---|---|---|---|
| 7,483,387 B2 * | 1/2009 | Guichard et al. | 370/252 |
| 2003/0135556 A1 * | 7/2003 | Holdsworth | 709/206 |
| 2007/0140250 A1 * | 6/2007 | McAllister et al. | 370/392 |
| 2008/0095134 A1 | 4/2008 | Chen et al. | |
| 2008/0101368 A1 * | 5/2008 | Weinman | 370/392 |
| 2009/0129772 A1 | 5/2009 | Trudel et al. | |
| 2009/0232011 A1 * | 9/2009 | Li et al. | 370/248 |
| 2009/0238087 A1 | 9/2009 | Shikowitz et al. | |
| 2010/0142538 A1 * | 6/2010 | Glover et al. | 370/400 |
| 2011/0271007 A1 * | 11/2011 | Wang et al. | 709/238 |
| 2012/0026880 A1 * | 2/2012 | Miller et al. | 370/235 |
| 2012/0151204 A1 * | 6/2012 | Jamrog et al. | 713/150 |
| 2013/0268801 A1 * | 10/2013 | Yamato | 714/4.11 |

OTHER PUBLICATIONS

International Application No. PCT/US2012/032962—PCT International Search Report dated Jun. 19, 2012.

* cited by examiner

*Primary Examiner* — Dang Ton
*Assistant Examiner* — Ronald H Davis

(57) ABSTRACT

An open communication method between at least two sub-networks using a broker node. Each of the sub-networks has a different routable network addressing scheme. The method comprises receiving a packet for a specific application, the packet includes an application identifier, determining if the packet is to be relayed to another of the at least two sub-networks based upon the application identifier, determining if a node receiving the packet is a broker node, relaying the packet to a broker node if not a broker node and forwarding, by the broker node, the packet to at least one node in another of the at least two sub-networks. The node generating the packet communicates using a first of the at least two sub-networks. A broker node communicates using at least two of the at least two sub-networks via a corresponding routable network addressing schemes for each of the sub-networks.

15 Claims, 28 Drawing Sheets

Broker Table
1000

| Broker Address | Timer | Parameters |
|---|---|---|
| .. | | |
| .. | | |
| .. | | |

| Source Address | Broker Assigned identifier E.g., Port Number |
|---|---|
| Geo-XYZ | 23 |
| Geo-ABC | 97 |
| .... | |

OPEN COMMUNICATION METHOD IN A HETEROGENEOUS NETWORK

FIELD OF THE INVENTION

This invention relates to open communication between moving vehicles and road-side units or infrastructure where the different vehicles and road-side units may be configured for communication in different sub-networks.

BACKGROUND OF THE INVENTION

Wireless communication has become common in all aspects of life today, whether it be a wireless home or office network, so-called "hotspot" networks at local cafes, fast food chains or hotels, or even citywide implementations of WiFi technologies. This desire to become a society of wireless communication has even extended to moving devices such as a moving vehicle with the use of mobile networks. This type of wireless networking may appear in many aspects of vehicle safety applications, including, but not limited to, urgent road obstacle warning, intersection coordination, hidden driveway warning, lane-change or merging assistance. In the mobile networks, different sub-networks are used for communication and grouping vehicles and road-side units (RSUs) such as geographic based sub-networks or peer-group based sub-networks. An local peer group network is described in U.S. Pat. No. 7,848,278 issued Dec. 7, 2010 and assigned to Telcordia Technologies, Inc., et al ("Telcordia Tech"), the contents of which is incorporated herein by reference.

However, with the use of different sub-networks, vehicles and RSUs configured to communicate in one sub-network cannot communicate with vehicles and RSUs in another sub-network. This is because of the incompatibilities among the different sub-networks such as naming, addressing routing and radio technologies. For example, a geo-based source vehicle cannot send a traffic update message to a LPG-based vehicle.

U.S. application Ser. No. 13/085,967 assigned to Telcordia Technologies, Inc., et al ("Telcordia Tech") filed on Apr. 13, 2011, describes high level architecture that supports open communication between network nodes in heterogeneous networks, the contents of which is incorporated herein by reference.

SUMMARY OF THE INVENTION

Accordingly, disclosed is an open communication method between at least two sub-networks. Each of the sub-networks has a different routable network addressing scheme. The method comprises receiving a packet for a specific application, determining if the packet is to be relayed to another of the at least two sub-network based upon an application identifier, deter mining if a node receiving the packet is a broker node, relaying the packet to a broker node if not a broker node; and forwarding, by the node if it is the broker node, the packet to at least one node in another of the at least two sub-network. The packet includes an application identifier. A node generating the packet is configured to communicate using a first of the at least two sub-networks. A broker node is configured for communicating using at least two of the at least two sub-network via a corresponding routable network addressing schemes for each of the sub-networks.

The application can be an emergency service message (safety related), or a traffic update. Each broker node maintains and updates a broker table using information from status packets. Each broker node also periodically broadcasts a status packet to each sub-network that the broker node is configured to communicate.

The packet can be forwarded or relayed using one or more broker nodes. The number of broker nodes is determined in part by the application type. The broker nodes are selected based upon a selection criterion. The selection criterion can be, but is not limited to, a location of the broker node, a location of the destination node, the sub-net of the destination node and the type of sub-network of each broker node and the number of sub-networks each broker node is configured to communicate.

Also disclosed is an on-demand open communication method between at least two sub-networks, where each of the at least one sub-networks has a different routable network addressing scheme. The method comprise generating a request packet for an update by a requesting node, selecting a broker node by the requesting node, and transmitting the request packet to the selected broker node. The request packet includes an application peer identifier for a destination node of the request packet, an application identifier unique to an application and a routable network address for the selected broker node. A broker node is configured for communicating using at least two of the at least two sub-network via a corresponding routable network addressing schemes for each of the sub-networks.

Also disclosed is an on-demand open communication method between at least two sub-networks, where each of the at least one sub-networks has a different routable network addressing scheme. The method comprises receiving a request packet for an update by a requesting node, determining if the request packet is to be relayed to another of the at least two sub-network based upon the application identifier, and determining if the selected broker node is configured to communicate using a routable network addressing scheme for a sub-network corresponding with the destination node based upon the application peer identifier based upon local routing information. If the selected broker is not configured to communicate using the routable network addressing scheme for the sub-network corresponding with the destination node, the method further comprises selecting another broker node for relaying the request packet to the destination node, wherein another broker node is repeatedly selected by each subsequent broker node until the request packet reaches the sub-network corresponding with the destination node; and relaying the request packet to the another broker node. The request packet includes an application peer identifier for a destination node of the request packet and an application identifier unique to an application and a routable network address for a selected broker node.

The method further comprises recording a routable network address for a broker node that transmitted the request packet for each subsequent broker node and a corresponding outgoing port number in an active path routing table, wherein the active path routing table is used for routing the update in a reverse direction back to the requesting node.

Also disclosed is a computer readable storage medium having a program of instructions for causing a computer to execute an open communication method between at least two sub-networks, where each of the at least one sub-networks has a different routable network addressing scheme, the method comprises receiving a packet for a specific application, the packet including an application identifier, where a node generating the packet is configured to communicate using a first of said at least two sub-networks, determining if the packet is to be relayed to another of the at least two sub-network based upon the application identifier, determining if a node receiving the packet is a broker node, where a broker node is configured for communicating using at least two of the at least two sub-network via a corresponding routable network addressing schemes for each of the sub-networks, relaying the packet to a broker node if not a broker node and forwarding, by the broker node, the packet to at least one node in another of the at least two sub-network.

Also disclosed is a computer readable storage medium having a program of instructions for causing a computer to execute an on-demand open communication method between at least two sub-networks, where each of the at least one sub-networks has a different routable network addressing scheme, the method comprises receiving a request packet for an update by a requesting node, the request packet including an application peer identifier for a destination node of the request packet and an application identifier unique to an application and an routable network address for a selected broker node, determining if the request packet is to be relayed to another of the at least two sub-network based upon the application identifier; and determining if the selected broker node is configured to communicate using a routable network addressing scheme for a sub-network corresponding with the destination node based upon the application peer identifier based upon local routing information. If the selected broker is not configured to communicate using the routable network addressing scheme for the sub-network corresponding with the destination node, the method further comprises selecting another broker node for relaying the request packet to the destination node, wherein another broker node is repeatedly selected by each subsequent broker node until the request packet reaches the sub-network corresponding with the destination node and relaying the request packet to the another broker node.

Also disclosed is a computer readable storage medium having a program of instructions for causing a computer to execute an on-demand open communication method between at least two sub-networks, where each of the at least one sub-networks has a different routable network addressing scheme, the method comprises generating a request packet for an update by a requesting node, the request packet including an application peer identifier for a destination node of the request packet and an application identifier unique to an application, selecting a broker node by the requesting node, where a broker node is configured for communicating using at least two of the at least two sub-network via a corresponding routable network addressing schemes for each of the sub-networks and transmitting the request packet to the selected broker node.

BRIEF DESCRIPTION OF THE DRAWINGS

These and other features, benefits, and advantages of the present invention will become apparent by reference to the following figures, with like reference numbers referring to like structures across the views, wherein:

FIG. 10 illustrates an exemplary Broker Table in accordance with the invention;

FIG. 31 illustrates an exemplary active path routing table in accordance with the invention.

DETAILED DESCRIPTION OF THE INVENTION

Definitions

A "Node" is a router that implements the channel determination and selection process or method as specified in the following description. For example, a moving vehicle having a communication device is a node.

A "multicast message" is a message with greater or equal to one destination. For the purposes of the detailed description a multicast message is referenced as a multicast packet (MP).

A "hop" is a number of nodes in which a packet or message is relayed.

A "hop count" between two nodes, i.e., source to a destination, is equal to the number of relay nodes plus 1.

A "broker node" is a node configured to communicate using network protocols for at least two different networks, e.g., different sub-networks.

For the purpose of this description the term "packet" and "message" is used interchangeably.

Figure 1:
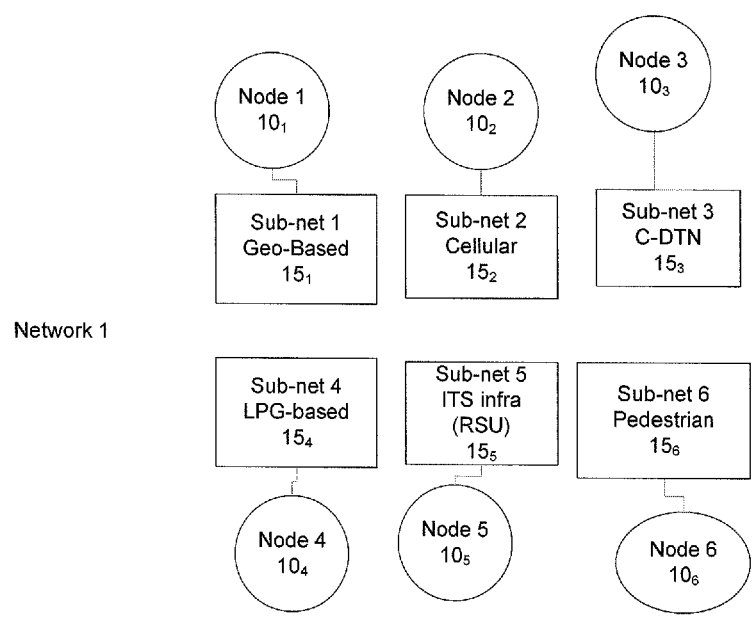
FIG. 1 illustrates an exemplary network having multiple sub-networks.

A heterogeneous network can consist of multiple sub-networks (generally references as "15" or "sub-net"). FIG. 1 illustrates an example of a network 1 having a plurality of sub-networks 15. As depicted in FIG. 1 there are six different sub-networks, e.g., sub-net 1-subnet 6($15_1$-$15_6$). A sub-network 15 is a connected set of nodes with a common addressing scheme. Additionally, each sub-network 15 has its own technologies and policies, including but not limited to, naming, addressing routing and radio technologies. For example, the address routing ("routable address") for a geo-based sub-network is defined by a location. The routable address for an IP-based sub-network is number IP addresses (class A, B, C, D, E IP addresses). The routable address for a cellular-based sub-network can be a cellular phone number. The routable address for a LPG-based sub-network can be a zip code or a vehicle identifier for a LPG group header node. RSUs or other infrastructure can have a routable address using multiple methods such as, but not limited to, IP addressing, location, etc. Node 10 can be either moving vehicles or road-side units. Additionally, a pedestrian with a wireless communication device can be a node 10. Nodes 10 typically can only communicate using the routable address and protocols for one of the sub-networks. For example, Node 1 $10_1$ communicates using sub-net 1 Geo-based $15_1$. Typically, a node 10 is configured with the protocol(s) for one communication network, i.e., one network layer. Without open communication, nodes 1-6 $10_{1-6}$ cannot communicate with each other.

Figure 2:
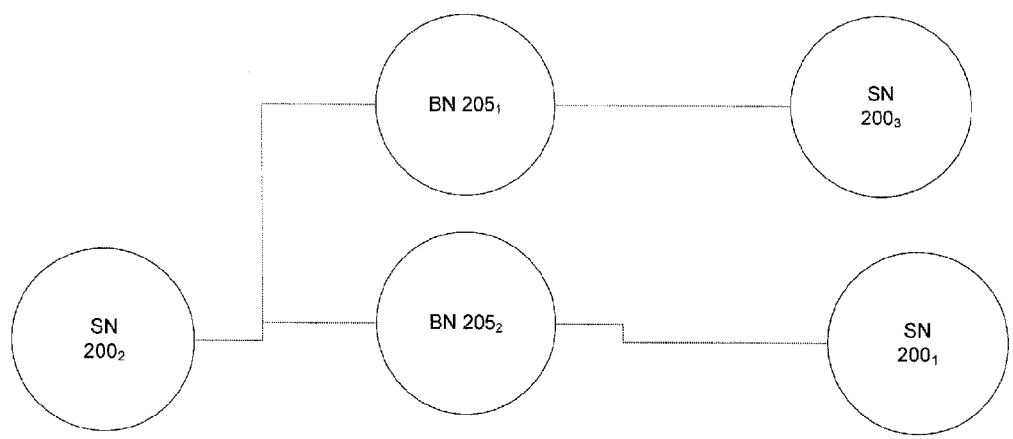
FIG. 2 illustrates an exemplary open communication network between heterogeneous nodes in accordance with the invention.

However, using an open communication network as disclosed herein, different user-platforms, e.g., sub-networks 15 are dynamically coordinated into one virtual network. FIG. 2 illustrates a block diagram of an open communication network 2 according to the invention. Nodes 10 in the open communication network 2 are divided into two types of nodes: simple nodes (SNs) 200 and broker nodes (BNs) 205.

A SN 200 is configured to communicate using one sub-network 15, e.g., apriori configured with the protocol of one sub-network 15. A SN 200 can handle only one addressing scheme, e.g., IP. A BN 205 enables message exchange between different sub-networks and dynamically coordinate different user platforms without apriori configurations of all of the nodes addresses in the sub-networks 15. A BN 205 is configured with at least two different sub-network protocols, e.g., at least two network layer protocols. Accordingly, BN 205 supports different address schemes, different routing protocols and different naming. For example, a BN 205 can support any and all of sub-net 1-subnet 6($15_1$-$15_6$). Any number of BNs 205 can be used in the open communication network 2 where each BN can have different sub-network capabilities.

The BNs 205 effectively act as a coordination plane between the SNs 200, e.g., a sub-network plane (individual sub-networks) and an application message plane (applications). The functions of the BNs 205 are application specific. For example, the functionality of a BN 205 for a safety related messages (e.g., broadcast-type of message dissemination) is different than the functionality for a unicast message (point to point or point to multi-points). The functionality for both will be described in detail later. The coordination plane and BN 205 encompass multiple protocol layers, i.e., radio, link, network, and application and it not a new layer in the network stacks.

A BN 205 actively disseminates or advertises its status as a BN. Additionally, a SN 200 can actively seek a BN 205.

Figure 3:
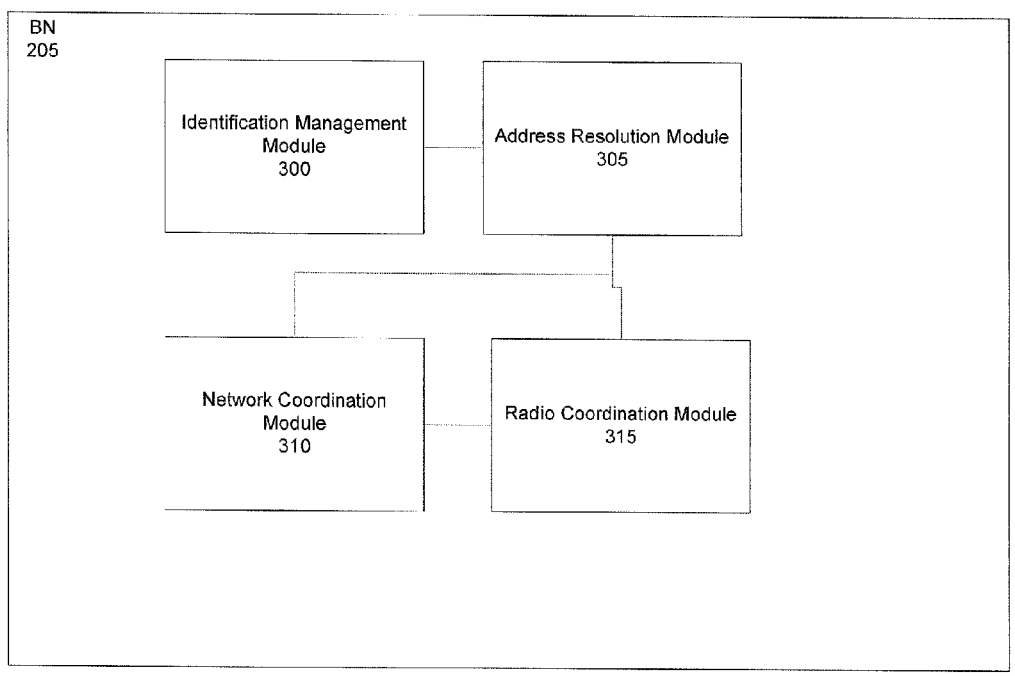
FIG. 3 is a block diagram of a broker node in accordance with the invention.

FIG. 3 illustrates a modular block diagram of an exemplary BN 205 in accordance with the invention. The BN 205 has four modules: an identification management module 300 (hereinafter "IMM"), an address resolution module 305 (hereinafter "ARM"), a network coordination module 310 (hereinafter "NCM") and a radio coordination module 315 (hereinafter "RCM"). The BN 205 manages identifications for SNs 200 in the heterogeneous network environment, i.e., identification management module 300, translates the identifications for the SNs 200 into sub-network specific routable addresses, i.e., address resolution module 305 and routes and forwards the messages to the sub-network, i.e., network coordination module 310 and selects a particular radio interface (when multiple radio interfaces are associated with the sub-network) for forwarding the messages, i.e., radio coordination module 315. The functionality of each module is different depending on the type of message being transmitted or routed.

For broadcast type messages, an SN 200 does not need to have any of the above-identified modules. However, for unicast or point-to-point messages, a SN 200 includes at least one of the modules.

Open communication can be used to deliver several different types of messages, such as, but not limited to, safety, warning and e-brake messages, traffic update messages and request/updated based point-to-point messaging.

Safety, Warning and E-Brake Messages

In the case of Safety related message, latency is important and as such the forwarding may only involve a single BN 205 since the use of multiple BNs would increase the latency. Additionally, the area of interest is small. In the context of vehicle safety related messages, neighboring nodes 10 within a certain number of vehicles would be interested. For example, immediate neighboring vehicles within 20-30 vehicles would be an example of a scope. Safety information is not distributed: a single source or few sources disseminate the safety information.

The sender (source node) of a safety related message is not aware of nodes with other network addresses, i.e., different sub-nets. Simultaneously the recipient is not aware of the different mutable network address types. As a result, the network heterogeneity is hidden from the sender and recipients.

In order to distribute a safety related message, each node 10 runs the same application. The application is identified by a unique application ID, e.g., application identifier. The safety related message is associated with a target geographical region and all nodes within the region, regardless of the routable network address type will receive the message.

Figure 4:
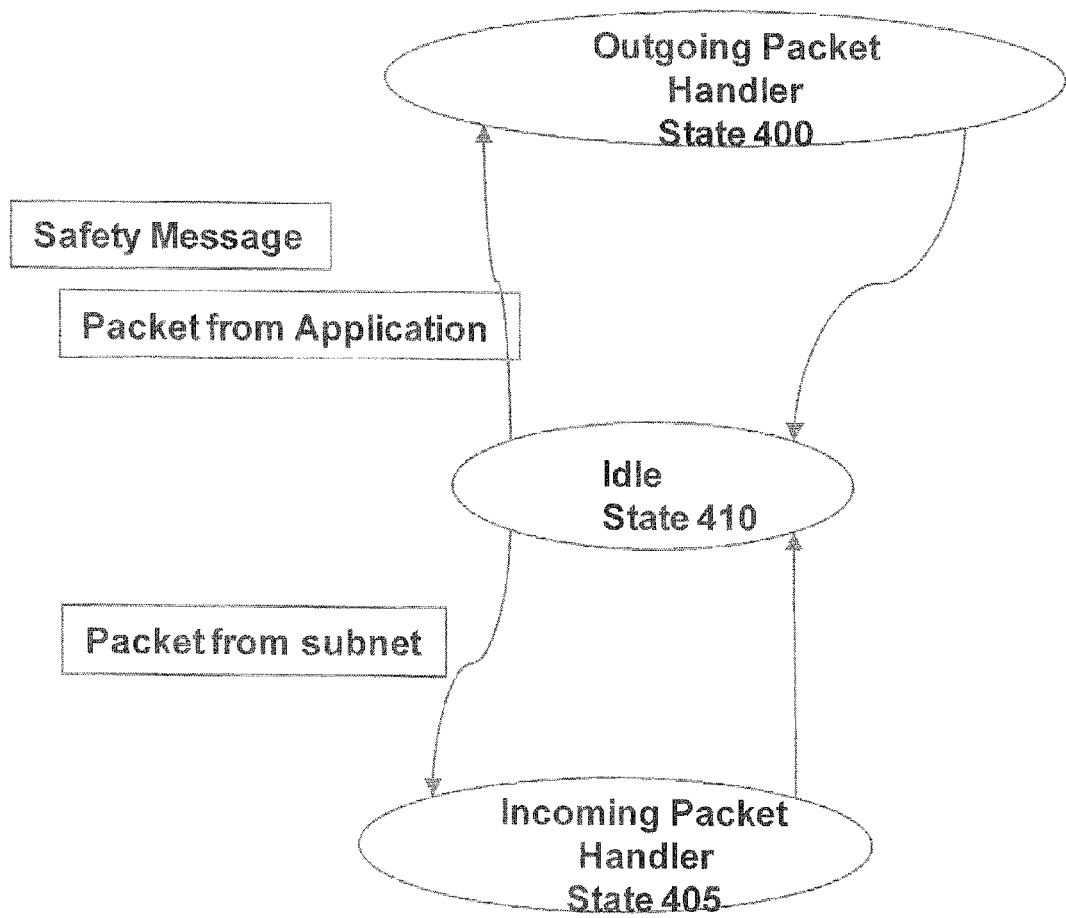
FIG. 4 illustrates a state machine for the simple node for processing safety packets in accordance with the invention.

To support safety related messaging, BN 205 uses the ARM 305, the NCM 310 and the RCM 315. There is no change to a SN 200. FIG. 4 illustrates a state machine for the SN 200 for safety related messaging. The SN 200 has two active states, the outgoing packet handler state 400 and the incoming packet handler state 405 and an idle state 410. When in an idle state 410, if a packet is received from the application, the SN 200 moves to the outgoing packet handler state 400. Once the packet is processed and is sent, the SN 200 returns to an idle state 410. When in an idle state 410, if a packet is received from another node 10, e.g., from a sub-net 15, the SN moves to the incoming packet handler state 405. The phrase idle state 410 as used in FIG. 4, and throughout this disclosure, refers to not performing the functionality described in the other states. However, the node can be performing other processes described herein.

Figure 5:
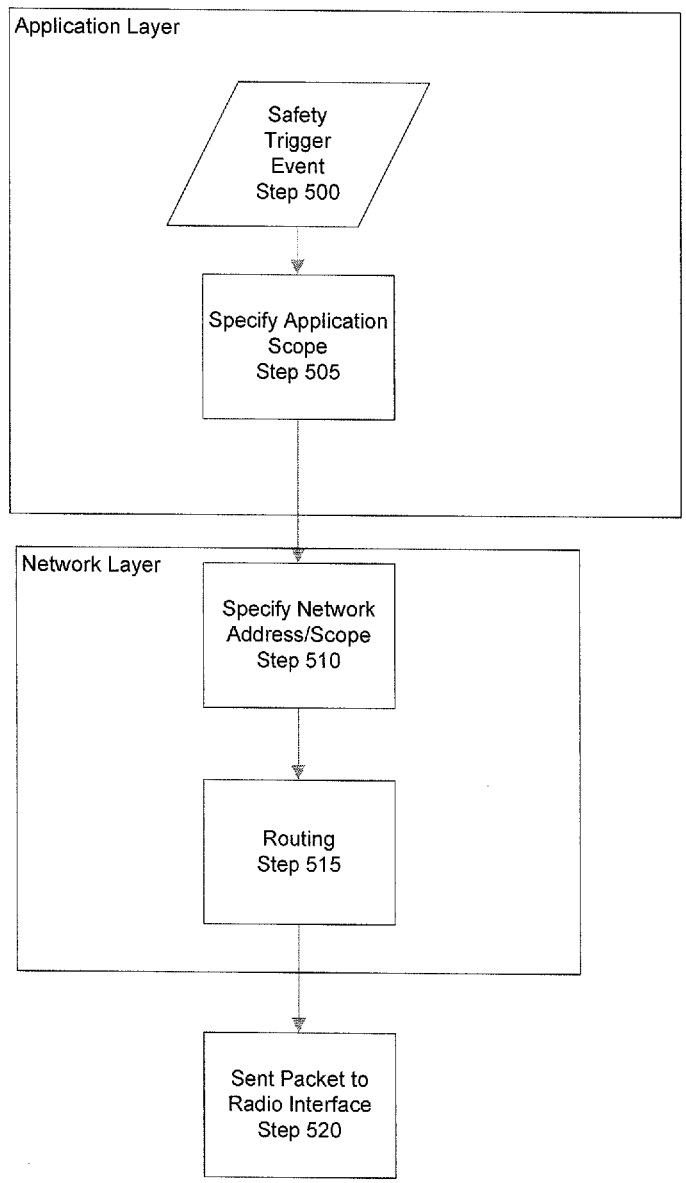
FIG. 5 illustrates a flow chart for the transmission of a safety related message (packet) by an SN in accordance with the invention.

FIG. 5 illustrates a flow chart for the transmission of a safety related message (packet) by an SN 200. Steps 510-520 are performed in the outgoing packet handler (state 400). At step 500, a safety related event is detected. The SN 200 determines a need for sending a safety related packet. At step 505, the scope for the transmission of the message is set. The scope can be, but is not limited to, a region of interest, a maximum number of hops (TTL), and maximum relay time. The scope is network specific. The scope determined in step 505 is an application scope. This scope is mapped to a network scope in step 510. Steps 500 and 505 are performed by the application layer. Steps 510 and 515 are performed by the network layer.

At step 510, the network layer obtains the routable network address and appends the address to the header as the destination. For safety related applications, the routable network address is the broadcast address used in the routing protocol for the specific sub-net 15. Additionally, as noted above, the network layer converts the application scope into the network scope. Each node 10 includes a mapping or conversion table for enabling the conversion. At step 515, the routing process is performed for the safety related packet. The routing process is network specific. The process includes, but is not limited to, route calculation, link weighting. These functions are performed by the network layer.

At step 520, the payload and header (complete packet) is sent to the radio interface (not shown) for transmission.

Figure 6:
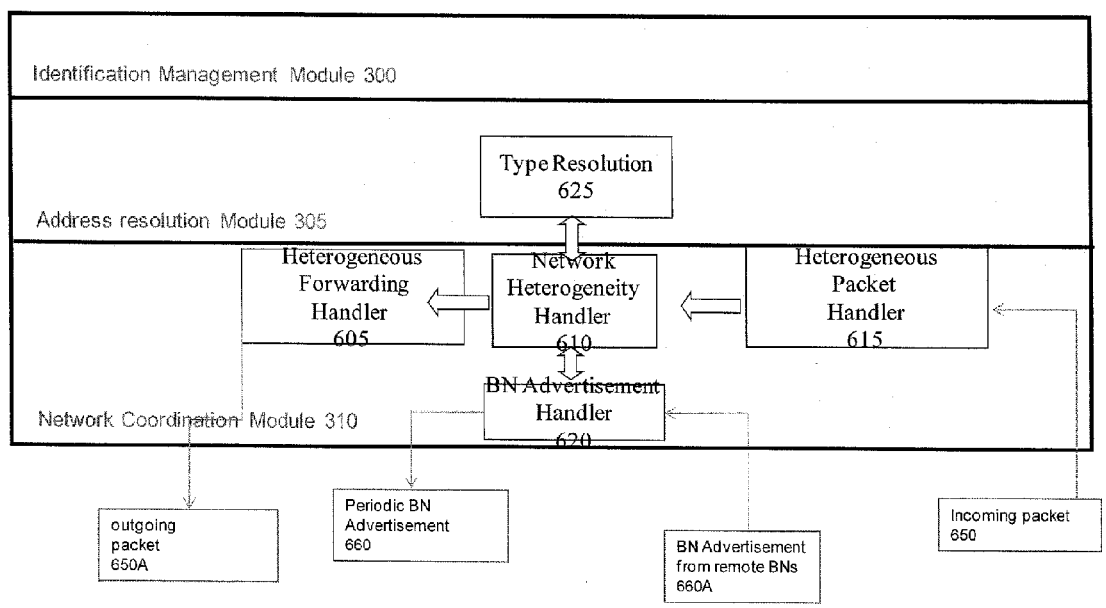
FIG. 6 illustrates module diagram for processing safety related packet in the broker node in accordance with the invention.

FIG. 6 illustrates module diagram for safety related packet processing in the BN 205. The RMC 315 is not depicted. The diagram illustrates various functions (handlers or sections) that comprise the module of the coordination plane. The functions in each module interact within a module and across different modules. The functionality of each handler will be described in later in detail. For safety related packets, the BNs 205 are able to recognize the application type using the unique application ID of the incoming packet 650, i.e., using the heterogeneous packet handler ("HPH") 615. The Type resolution 625 assists in obtaining the network type for a target network and the heterogeneous forwarding handler ("HFH") 605 is used for broadcasting the outgoing packet 650A, each of the native sub-nets of the BN 205. The BN Advisement Handler 620 is used to process BN advertisements 660A from other BNs and to periodically generate its own BN advertisement 660. BN advertisements 660(A) are used by the BNs 205 to inform both other BNs in the open network 1 of an available BN 205. The BN advertisements 660(A) are used to track BNs and their capabilities. The network heterogeneity handler ("NHH") 610 obtains the network address of the other BNs. These addresses are internally sent to the HFH 605.

Figure 7:
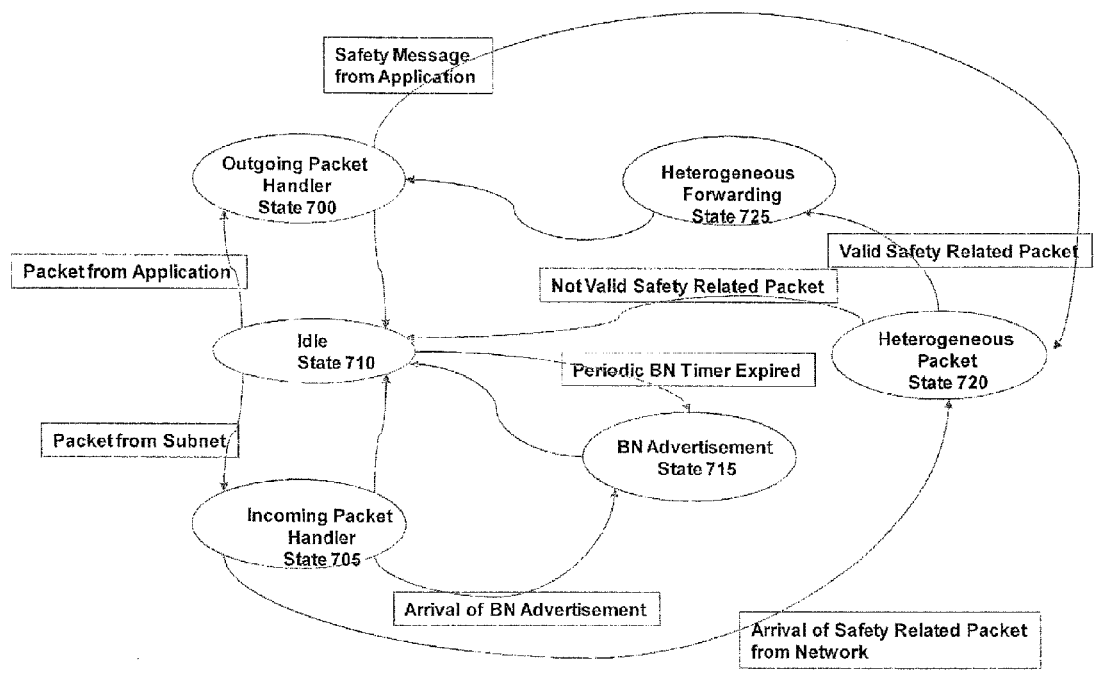
FIG. 7 illustrates a state machine for the broker node with respect processing safety related packets in accordance with the invention.

FIG. 7 illustrates a state machine for the BN 205 with respect to processing safety related packets. When in an idle state 710, if a packet is received from the application, the BN 205 moves to the outgoing packet handler state 700. Once the packet is processed and is sent, the BN 205 returns to an idle state 710. When in an idle state 710, if a packet is received from another node, e.g., from a sub-net 15, the BN 205 moves to the incoming packet handler state 705. Additionally, when in an idle state 710, if a timer expires, a BN advertisement 660 is triggered at step 715 (BN Advisement Handler 620). Once the BN advertisement 660 is transmitted, the BN 205 returns to the idle state 710. If the packet received from the sub-net 15 is a safety related packet/message, the BN 205 moves state 720 to determine if the packet needed to be forward heterogeneously (invokes the HPH 615). If the packet is not a valid safety related message, the BN 205 returns to an idle state 710. If the packet is a valid safety related packet, the BN 205 moves to the heterogeneous forwarding state 725 (invokes the heterogeneous forwarding handler 605 and the type resolution 625). Afterwards, the packet is also sent using the outgoing packet handler state 700. The packet is forwarded to each sub-net 15 by the heterogeneous forwarding state 725 and the outgoing packet handler state 700.

When the BN's application layer generates its own packet (non BN advertisement), the BN 205 moves from the idle state 710 to the outgoing packet handler state 700. If the packet is a safety related packet, the BN 205 moves to state 720 (invokes the HPH 615). Upon receiving a data packet, the HPH 615 (at state 720) checks the scope and network address of the packet to verify for further heterogeneous forwarding process. If the packet is not a valid safety related message, the BN 205 returns to an idle state 710. If the packet is a valid safety related packet, the BN 205 moves to the heterogeneous forwarding state 725 (invokes the heterogeneous forwarding handler 605 and the type resolution 625). Afterwards, the packet is also send using the outgoing packet handler state 700. The packet is forward to a different sub-net 15 by the heterogeneous forwarding state 725 and a local sub-net using the outgoing packet handler state 700.

The BN advertisement handler 620 (state 715) in a BN 205 is invoked by the Incoming packet handler (state 705) when the Incoming packet handler determines that an incoming packet from the network is a BN advertisement packet 660A. The phrase idle state 710 as used in FIG. 7 refers to not performing the functionality described in the other states. However, the node can be performing other processes described herein.

Figure 8:
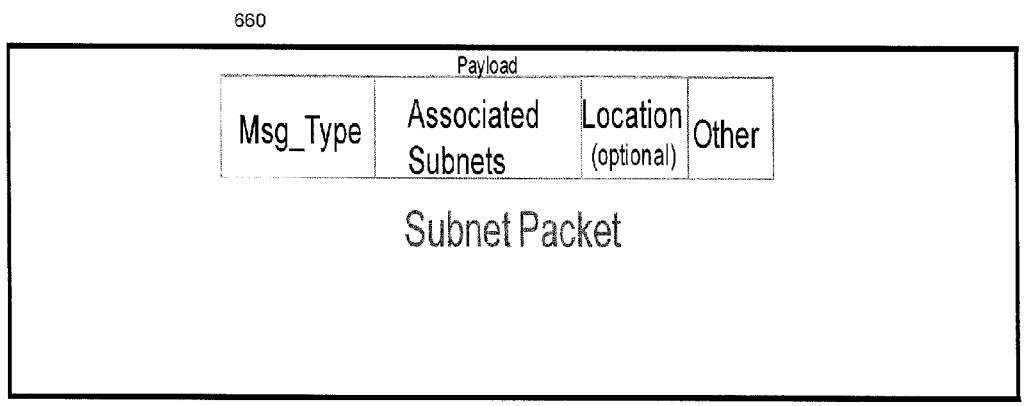
FIG. 8 illustrates an exemplary broker node advertisement in accordance with the invention.

The BN advertisement handler 620 broadcasts a BN advertisement 660. FIG. 8 illustrates an exemplary BN advertisement 660. The BN advertisement 660 includes a message type identifier, BN identifier, a sub-network specific routable address, a list of sub-networks that the BN is configured to communicate and a status identifier. The status identifier indicates that the node is a BN 205. The BN advertisement 660 is broadcast to each sub-network that the BN 205 is capable to communicate in, i.e., each sub-network that the BN is configured with a protocol. For example, if the BN 205 has a protocol for LPG-based address schemes and routing, IP based address schemes and routing and geographical based address schemes and routing, then the BN 205 will broadcast three separate BN advertisements. The first BN advertisement will include an LPG-based routable address for the BN, a LPG based name and a BN status identifier. The second BN advertisement will include an IP routable address for the BN, an IP based name and a BN status identifier. The third BN advertisement will include a geographical based routable address for the BN, a geographical based name and a BN status identifier. The packet is native to the subnet 15 i.e. in a LPG network an LPG packet is used with the payload as defined above. The BN advertisement 660 can optionally include location information. The field marked "other" may include Broker specific information such as mobility characteristics, other associated brokers etc.

The BN advertisement 660 is broadcast using a broadcast routable address specific to the sub-network 15. Each sub-network 15 has a dedicated routable address for broadcasting. The dedicated routable address for broadcasting for each of the sub-networks 15 which a BN 205 is capable of communicating in is a priori known. The broadcast routable address is associated with the appropriate sub-network 15. For example, for an IP-based sub-network, x.y.z.255 can be used. For an LPG-based sub-network, an LPG-ID plus a broadcast specific field such as, but not limited to, "0000" can be used. For a geo-based sub-network, geographical coordinates representing a destination area (broadcast region) instead of a specific coordinate for a destination point can be used.

Figures 9A, 9B:
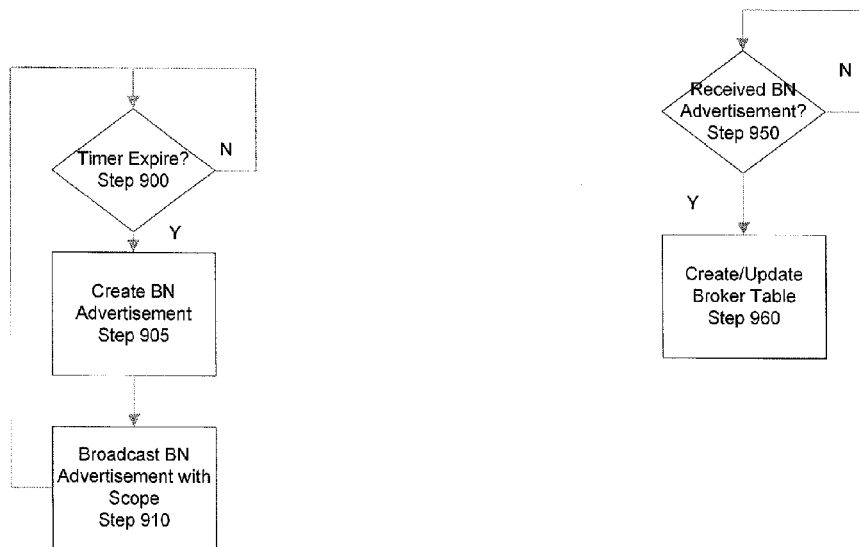
FIGS. 9A and 9B illustrate flow charts for a broker node advertisement handler in accordance with the invention.

FIGS. 9A and 9B illustrate flow charts for the BN advertisement handler 620. FIG. 9A is a flow chart for generating the BN advertisement 660. FIG. 9B is a flow chart for receiving a BN advertisement 660A. The BN advertisement 660 is periodically broadcast. At step 900, the BN 205 determined if it is time to broadcast the BN advertisement 600. If not ("N") the BN 205 remains in the idle state 710. If the time has expired, the BN 205 creates the BN advertisement 660 at step 905. If the BN advertisement 660 includes location information, the BN 205 obtains its current location. The current location can be obtained using a GPS device (not shown). Additionally, if the BN advertisement 660 includes information related to other BNs, i.e., connectivity or presences, the BN 205 will determine if there was a change from the last time it broadcasted the BN advertisement 660. At step 910, the BN 205 broadcasts the BN advertisement 660. Optionally, the BN 205 can set a scope for the BN advertisement 660. The scope is network specific and can be, but is not limited to, hop count (TTL), time of transmission and location.

The BN 205 maintains a Broker Table (FIG. 10, 1000) having an entry for all other BNs. The Broker Table 1000 is continually updated based on the received BN advertisements 660A. For Safety related packets, SN 200 may broadcast a message without regard to the neighboring brokers. Therefore, the SN 200 does not need to maintain a Broker Table 1000. At step 950, the BN 205 determines if a BN advertisement 660A has been received. The BN advertisement handler 620 in a BN 205 is invoked by the Incoming packet handler when the Incoming packet handler determines that an incoming packet from the network is a BN advertisement ("Y" at step 950). At step 960, the Broker Table 1000 is modified based upon the received BN advertisement 660A. The BN 205 determines if the packet is received from a new BN. If the BN advertisement 660A originated from a new BN, a new entry is added into the table. If the packet is received from an existing BN (a BN already in the table), the information in the broker Table 1000 is updated, e.g., new location and different associated broker nodes. If a BN advertisement 660A is not received ("N" at step 950), the BN 205 remains in idle state 710.

FIG. 10 illustrates an exemplary Broker Table 1000. The Broker Table 1000 includes a column for the Broker's routable address, a timer and parameters. The parameters include the broker's sub-net 15 configurations, current location and other associated brokers. The timer is a staleness timer. If a BN advertisement 660A is not received from a BN listed in the Broker Table 100, the entry is purged after a predetermined time. The predetermined time can be a function of a BN advertisement cycle period. The BN advertisement cycle period is the time between two successive BN advertisements.

Figure 11:
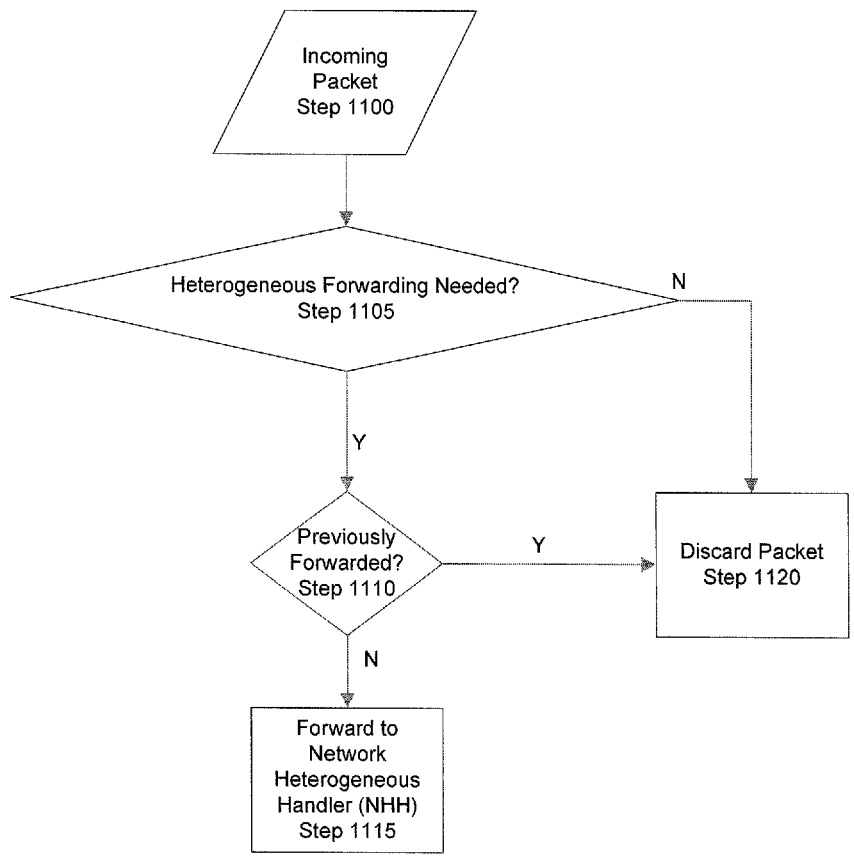
FIG. 11 illustrates a flow chart for the heterogeneous packet handler with respect processing safety related packets in accordance with the invention.

FIG. 11 illustrates a flow chart for the HPH 615 (at state 720). At step 1100, a packet is received by the HPH 615. At step 1105, the HPH 615 determines if heterogeneous forwarded is needed. The determination is based upon the application identifier in the packet. Alternatively, the packet can include a flag indicative of heterogeneous forwarding. If the application identifier corresponds to a safety related application, the packet is a candidate for heterogeneous forwarding in this example. There are other application identifiers that trigger a heterogeneous forwarding; however, for purposes of the description for safety related application, the triggering packet is a packet for a safety related application. If no heterogeneous forwarding is needed, the HPH 615 discards the packet at step 1120. Step 1120 uses the phrase "discards the packet". This only refers to discarding the packet by the HPH 615. However, the packet might be forwarded in the home sub-net using the outgoing packet handler. If the packet is a candidate for heterogeneous forwarding ("Y" at step 1105), a determination is made if the packet has been already forwarded by another BN at step 1110. This is determined using the Broker Table 1000. The HPH 615 matches the packet address with the BN information in the Broker Table 1000. A match is indicative of the packet being previously forwarded by another BN.

If the packet has already been forwarded by another BN ("Y" at step 1110), then the packet is discarded by the HPH 615 since it may not meet latency requirements at step 1120. If the packet has not been previously forwarded by another BN, the packet is forwarded to the NHH 610 at step 1115. The address resolution module 305 is queried e.g., type resolution 625.

Figure 12:
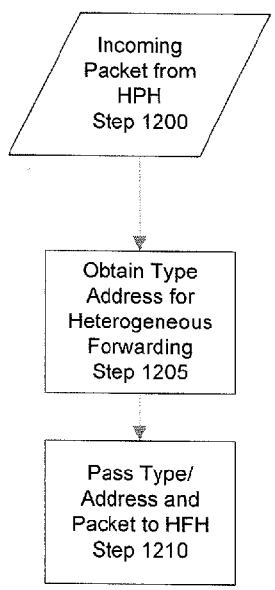
FIG. 12 illustrates a flow chart for the network heterogeneity handler with respect processing safety related packets in accordance with the invention.

FIG. 12 illustrates a flow chart for the NHH 610. At step 1200, the packet is received from the HPH 615 (internally forwarded by HPH 615 in step 1115). At step 1205, the NHH 610 determines the target sub-net 15 using the type resolution 625 in the ARM 305. Specifically, the NHH 610 obtains the broadcast routable address for the target sub-net(s) for the type resolution 625. Although, as described herein, a single BN 205 is used to forward a safety related packet, multiple BNs 205 may be selected. Additionally, all BNs 205 may be selected depending on the message. Therefore, prior to step 1205, the BN(s) 205 is selected. The address for each selected BN 205 is also retrieved. The packet will be broadcast using the broadcast routable addresses for each sub-net $15_n$. At step 1210 the packet, the target network type and broadcast routable address is sent to the HFH 605.

Figure 13:
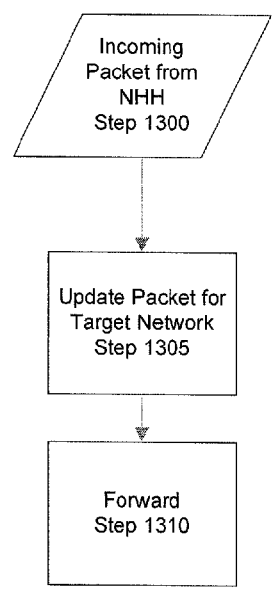
FIG. 13 illustrates a flow chart for the heterogeneous forwarding handler with respect processing safety related packets in accordance with the invention.

FIG. 13 illustrates a flow chart for the HFH 605. At step 1300, the packet is received from the NHH 610 (internally forwarded by NHH 610 in step 1210). The HFH 605 modifies the destination address in the packet with the broadcast identifier(s) for the target sub-net(s) at step 1305. At step 1310, the HFH 605 sends the packet to the radio interface for forwarding. At this stage, the outgoing packet 650A has a different routable address for the destination as compared to when incoming packet 650 entered the coordination modules. The outgoing packet 650A is sent to a different network stack and may or may not go over the same radio interface.

Traffic Update Messages

Traffic update message operate over a wider area than safety related messages and can accommodate a greater delay, i.e., minutes. A C-DTN may be included in the open communication network 2. The sender (source node) of a safety message is not aware of the nodes with other network addresses, i.e., different sub-nets. Simultaneously the recipient is not aware of the different routable network address types. As a result, the network heterogeneity is hidden from the sender and recipients.

In order to distribute a traffic update related messages (packets), each vehicle runs the same application. The application is identified by a unique application ID. The traffic update related message is associated with a target geographical region and all nodes within the region, regardless of the routable network address type will receive the message.

The target geographical region of interest can be several miles include hundreds of moving nodes.

Since the area is larger and delay is less of a concern, multiple BNs can be used to forward the traffic update related messages. Therefore, BN 205 must maintain coordination amongst themselves and maintain connectivity. The BN advertisements 660 and 660A are used to dynamically coordinate BNs 205.

Many of the functionality and handlers in the BN 205 are the same as for forwarding a safety related message and therefore, will not be described in detail again. Similarly, many of the functionality of a SN 200 is the same as for generating a safety related message and therefore, will not be described in detail again.

Figure 14:
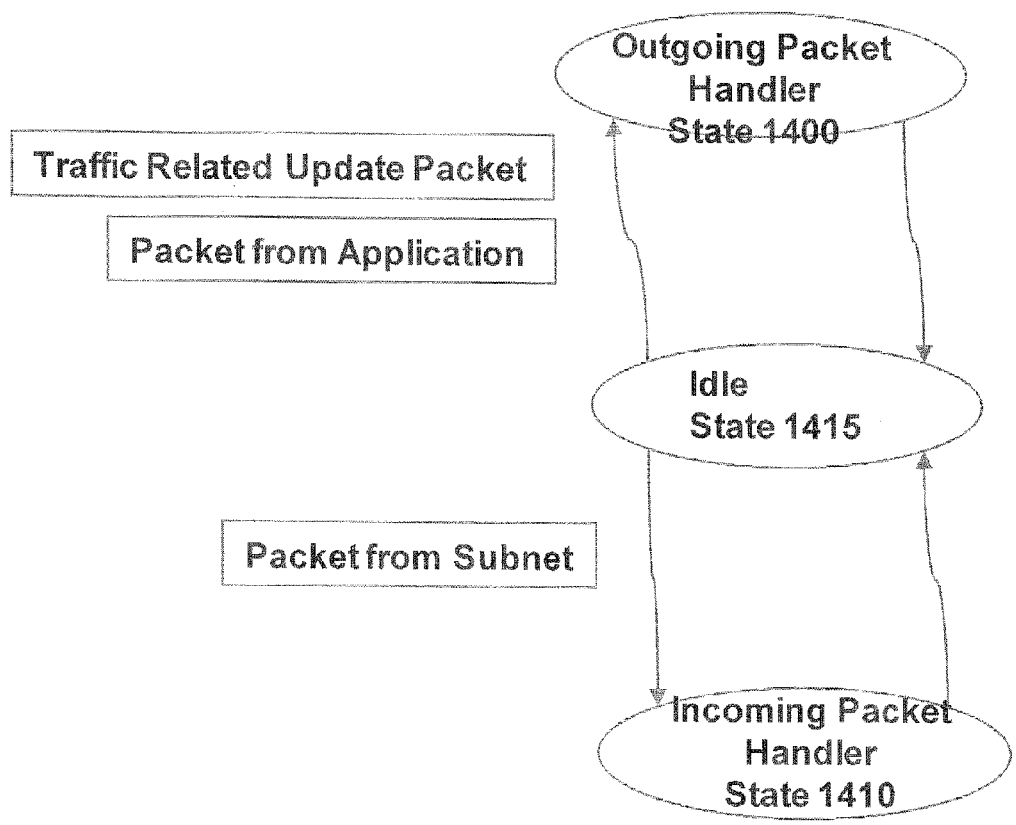
FIG. 14 illustrates a state machine for the simply node for traffic update related messaging in accordance with the invention.

FIG. 14 illustrates a state machine for the SN 200 for traffic update related messaging. The SN 200 has two active states, the outgoing packet handler state 1400 and the incoming packet handler state 1410 and an idle state 1415. When in an idle state 1415, if a packet is received from the application, such as traffic update related messages, the SN 200 moves to the outgoing packet handler state 1400. Once the packet is process and is sent, the SN 200 returns to an idle state 1415. When in an idle state 410, if a packet is received from another node, e.g., from a sub-net 15, the SN moves to the incoming packet handler state 1410. The phrase idle state 1415 as used in FIG. 14 refers to not performing the functionality described in the other states. However, the node can be performing other processes described herein. FIG. 14 is similar to FIG. 4.

Figure 15:
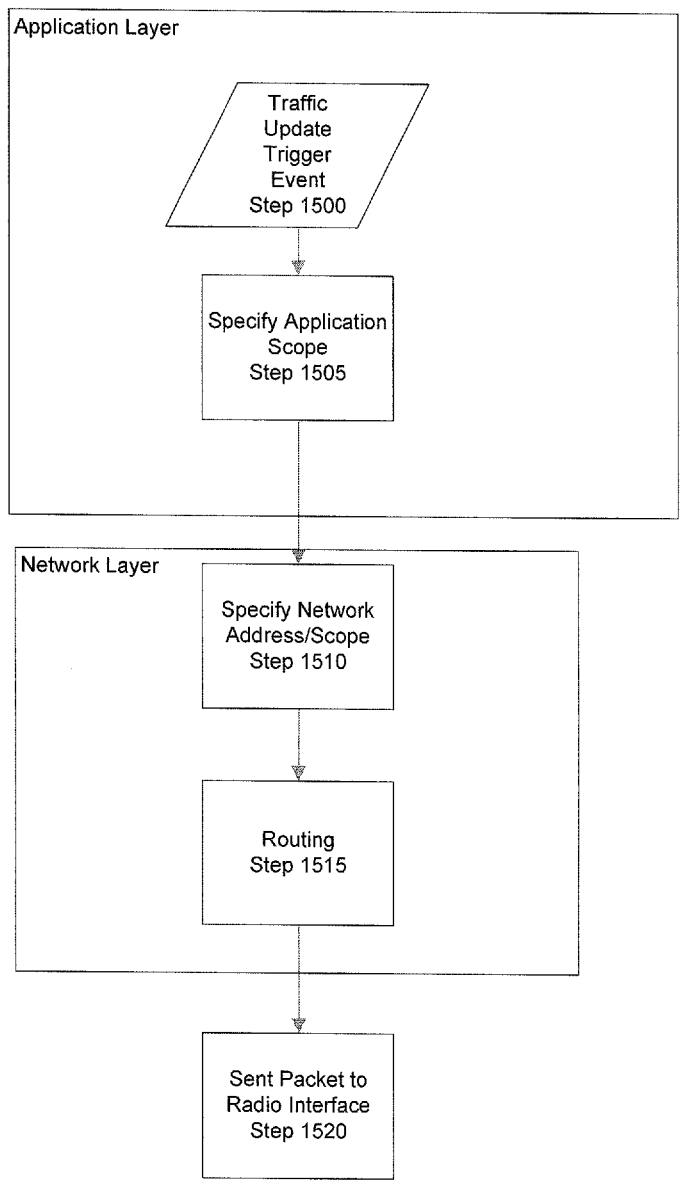
FIG. 15 illustrates a flow chart for the transmission of a traffic update related message (packet) by an SN in accordance with the invention.

FIG. 15 illustrates a flow chart for the transmission of a traffic update related message (packet) by an SN 200. Steps 1510-1520 are performed in the outgoing packet handler state 1400. FIG. 15 is similar to FIG. 5 (safety related message) and therefore, only the differences will be described in detail. At step 1500, a traffic alert or update event is detected. The SN 200 determines a need for sending a traffic update related event such as accident delays or construction. At step 1505, the scope for the transmission of the message is set. The scope can be, but is not limited to, a region of interest, a maximum number of hops (TTL), and maximum relay time. The application scope for a traffic update related message is larger than the application scope for the safety related message. Additionally, the application layer appends the application identifier to the packet. The application identifier indicates that the application/message is for a traffic update related message.

At step 1510, the network layer obtains the routable network address and appends the address to the header as the destination. For traffic update related messages, the routable address is the broadcast address used for the routing protocol. Additionally, as noted above, the network layer converts the application scope into the network scope. The node includes a mapping or conversion table for enabling the conversion. At step 1515, the routing process is performed for the traffic update related message/packet. The routing process is network specific. The process includes, but is not limited to, route calculation, link weighting. These functions are performed by the network layer. At step 1520, the packet is send to the appropriate radio interface.

The module diagram for a BN 205 for traffic update related packet processing is the same as for safety related packet processing as depicted in FIG. 6. However, the functionality of the NHH 610 is different. The NHH additionally, selects a additional BN to forwarding the traffic update related packets. The functions in each module interact within a module and across different modules. The functionality of each handler will be described in detail later. For traffic update related packets, the BNs 205 are able to recognize the application type using the unique application ID of the incoming packet 650 and use the heterogeneous packet handler ("HPH") 615.

Figure 16:
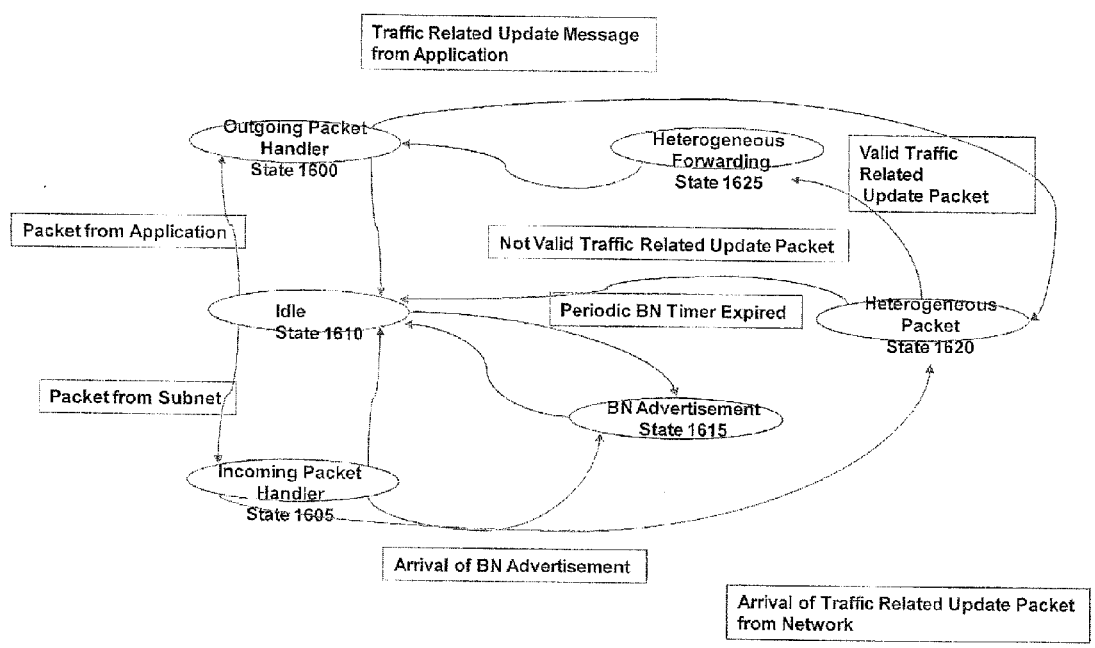
FIG. 16 illustrates a state machine for the broker node with respect to processing traffic update related packets in accordance with the invention.

FIG. 16 illustrates a state machine for the BN 205 with respect to packets from an application layer including traffic update related packets. FIG. 16 is similar to FIG. 7 (traffic update verses safety). The following description of FIG. 16 is to highlight the difference between the packet processing of a traffic update related packet and a safety related packet. The main different is that a traffic update related packet is also forwarded to at least one additional BN (secondary BNs). This is to disseminate the packet in a greater distance, i.e., scope is larger in a traffic update related packet. When in an idle state 1610, if a packet is received from the application, the BN 205 moves to the outgoing packet handler state 1600. Once the packet is process and is sent, the BN 205 returns to an idle state 1610. When in an idle state 1610, if a packet is received from another node, e.g., from a sub-net 15, the BN 205 moves to the incoming packet handler state 1605. Additionally, when in an idle state 1610, if a timer expires, a BN advertisement is triggered at step 1615 (BN Advisement Handler 620). The periodic time for transmitting a BN advertisement can be less than the periodic time for transmitting the BN advertisement for the safety related applications. This is because coordination between BNs is needed for maintaining connectivity and routes between BNs. The updating of the routing information needs to be quicker than for the safety related applications. Once the BN advertisement is transmitted, the BN 205 returns to the idle state 1610.

If the packet received from the sub-net 15 is a traffic update related packet/message, the BN moves state 720 to determine if the packet needed to be forward heterogeneously (invokes the HPH 615). The HPH 615 examines the application identifier and the scope. If the packet is not a valid traffic update related message, the BN 205 returns to an idle state 1610. If the packet is a valid traffic update related packet, the BN 205 moves to the heterogeneous forwarding state 725 (invokes the heterogeneous forwarding handler 605 the NHH 610 and the type resolution 625). The NHH 610 selects at least one additional BN 205 for forwarding the traffic related update message.

Afterwards, the packet is also send using the outgoing packet handler state 1600. The packet is forward to a different sub-net 15 by the heterogeneous forwarding state 725 and a local sub-net using the outgoing packet handler state 1600.

When the BNs 205 application layer generates its own packet (non BN advertisement), the BN 205 moves from the idle state 1610 to the outgoing packet handler state 1600. If the packet is a traffic update related packet, the BN 205 moves to state 1620 (invokes the HPH 615). Upon receiving a data packet, the HPH 615 (at state 720) checks the scope and network address of the packet to verify for further heterogeneous forwarding process. If the packet is not a valid traffic update related message, the BN 205 returns to an idle state 1610. If the packet is a valid traffic update related packet, the BN 205 moves to the heterogeneous forwarding state 1625 (invokes the heterogeneous forwarding handler 605, the NHH 610 and the type resolution 625). Afterwards, the packet, e.g., 650A, is also sent using the outgoing packet handler state 700. The packet, e.g., 650A is forward to a different sub-net 15 by the heterogeneous forwarding state 725 and a local sub-net using the outgoing packet handler state 700. Additionally, the outgoing traffic update related packet, e.g., 650A, is forwarded to another BN. The phrase idle state 1610 as used in FIG. 16 refers to not performing the functionality described in the other states. However, the node can be performing other processes described herein.

The BN advertisement handler 620 broadcasts a BN advertisement 660 (660A). FIG. 8 illustrates an exemplary BN advertisement 660 (660A). The BN advertisement 660 (660A) includes a message type identifier, BN identifier, a sub-network specific routable address, a list of sub-networks that the BN is configured to communicate and a status identifier. The status identifier indicates that the node is a BN 205. The BN advertisement 660 (660A) is broadcast to each sub-network that the BN 205 is capable of communication, i.e., each sub-network that the BN is configured with a protocol for. The BN advertisement 660 (660A) is broadcast using a broadcast routable address specific to the sub-network. Each sub-network has a dedicated routable address for broadcasting. The BN advisement 660 (660A) used for traffic update related packets can be the same format as depicted in FIG. 8. However, for safety related message, location information was optional, but for traffic update related packets, the location information should be included. Additionally, the other field should include Broker specific information such as mobility characteristics, other associated brokers etc. The additional information is used to update the Broker Table 1000 and used by the NHH 610 to determine the additional BNs (secondary BN).

Figure 17:
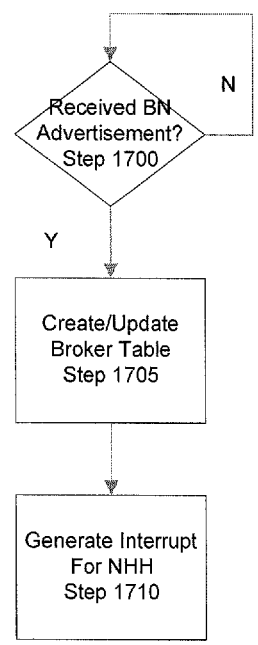
FIG. 17 illustrates a flow chart for the broker node advertisement handler for processing broker node advertisement to support a traffic update related packet in accordance with the invention.

The BN 205 maintains a Broker Table (FIG. 10, 1000) having an entry for the other BNs. FIG. 17 illustrates a flow chart for the BN advertisement handler for processing BN advertisement to support a traffic update related packet. The Broker Table 1000 is continually updated based on the received BN advertisements 660A. For traffic update related packets, SN 200 may however broadcast a message without regard to the neighboring brokers. Therefore, a SN 200 does not have to maintain the Broker Table 1000. At step 1700, the BN 205 determines if a BN advertisement 660A has been received. The BN advertisement handler 620 in a BN 205 is invoked by the Incoming packet handler when the Incoming packet handler determines that an incoming packet from the network is a BN advertisement ("Y" at step 1700). At step 1705, the Broker Table 1000 is modified based upon the received BN advertisement 660A. The BN 205 determines if the packet is received from a new BN. If the BN advertisement 660A originated from a new BN, a new entry is added into the table. If the packet is received from an existing BN (a BN already in the table), the information in the Broker Table 1000 is updated, e.g., new location and different associated broker nodes. If a BN advertisement 660A is not received ("N" at step 1700), the BN 205 remains in idle state 1610. At step 1710, the BN advertisement handler 620 generates an internal interrupt for the NHH 610. The NHH 610 evaluates its selection of the additional BNs (secondary BNs) based upon the new information/update information in the Broker Table 1000. The staleness timer is reset for each other BN that the BN received the BN advertisement 660A from.

The HPH 615, NHH 610 and HFH 605 function in a similar manner as illustrated in FIGS. 11-13, respectively. However, for traffic update related packet, step 1110 from FIG. 11 is omitted. The packet can be forwarded even if another BN has already forwarded the packet.

Figure 18:
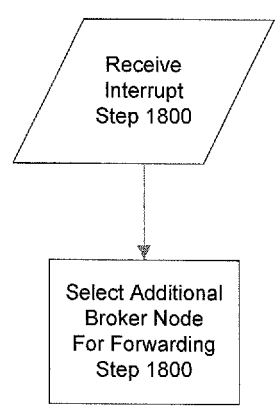
FIG. 18 illustrates a flow chart for additional functions of the network heterogeneity handler for supporting traffic update related packets in accordance with the invention.

FIG. 18 illustrates a flow chart for additional functions of the NHH 610. The NHH 610 selects the additional BNs. In other words, the NHH 610 serves as a coordination handler for the BN 205 for establishing and maintains a network of connected BNs for the dissemination of the packets. The steps depicted in FIG. 18 are in addition to the steps depicted in FIG. 12.

The additional BN can be selected based on the location of the relevance of the packet, location information for the available brokers, the number of sub-nets that a broker is configured to communicate in, and a priority of sub-nets. One or more of these factors can be combined to create a selection score. Each criterion can be assigned a value from 0 to 1. Each value is added to generate the selection score. The BN with the highest score is selected. Additionally, each factor can be weight. The value assigned to each criterion can be multiplied by the weight. The weighted values are added to generate the selection score. The BN with the highest weighted selection score is selected.

For example, a BN having IP sub-net capability can be given a higher priority. Additionally, if a BN is closer to the location of relevance of the packet (or location of the source), it can be selected since it would increase the likelihood that the packet reaches the entire region of relevance.

The selection process is also performed each time a traffic update packet is received by a BN 205. The pro active selection of the other BN (secondary BN) is used to modify recent selections if the BN moved out of range, changed location (but still is in range) or changed a configuration. The NHH 610 maintains a history of selected BNs. A new BN can be selected to give preference to maintaining a recently selected BN as the newly selected BN.

Alternatively, all BNs 205 in the Broker Table 1000 can be selected. For each BN selected, the traffic update packet is transmitted to the selected BN When the NHH 610 receives the packet from the HPH 615, it determines the target sub-net 15 using the type resolution 625 in the ARM 305. The packet will be broadcast using the broadcast routable addresses for each sub-net $15_n$. The packet, the target network type and broadcast routable address is sent to the HFH 605. The HFH 605 modifies the destination address in the packet with the broadcast identifier(s) for the target sub-net(s). The HFH 605 sends the packet to the radio interface for forwarding. At this stage, the outgoing packet 650A (traffic update related packet) has a different routable address for the destination as compared to when incoming packet 650 entered the coordination modules. The outgoing packet 650A is sent to a different network stack and may or may not go over the same radio interface. Accordingly, the traffic update related packet is transmitted by at least two BNs.

Request-Based Updates

Request based-updates are generated by in individual node and can traverse multiple sub-nets $15n$ over an unknown distance. Therefore, a request based-update related packet is likely to traverse multiple BNs 205 and requires significant coordination and connectivity between multiple BNs.

A node, such as a moving vehicle, can request updates such as software, maps, and other information from a server. The node may support geo, LPG etc. network protocols. The servers are likely an IP based sub-net server. The node is aware of the target server's application peer-address, e.g.

maps.xyz.com. This address is included in the request packet. To support request-based update related packets across heterogeneous network, both the SN 200 and the BN 205 have coordination management Modules. For example, the SNs 200 will have a NCM 310A and a RCM (not shown). The NCM 310A in the SN 200 will be a simplified version of the NCM in the BN 205.

Figure 19:
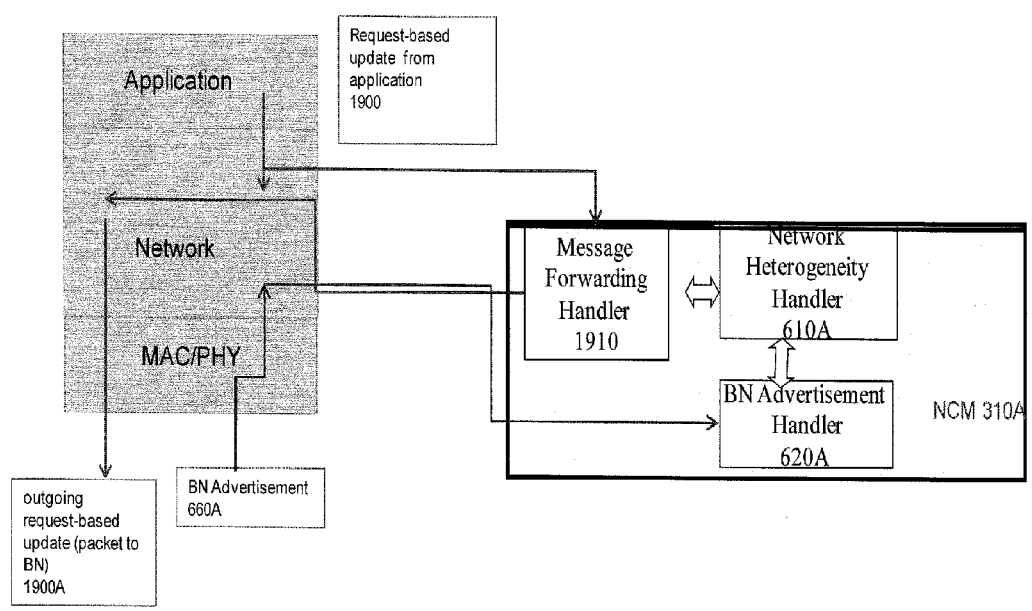
FIG. 19 is a schematic diagram of a simple node that is the source of a request-based update packet in accordance with the invention.

FIG. 19 is a schematic diagram of a SN 200 that is the source of a request-based update packet (request packet). The diagram illustrates the interaction between the network stacks and the coordination modules. There is no change to the functionality of the network stacks.

As depicted in FIG. 19, an application layer creates a request based update (1900). The application send the packet to the coordination modules (namely NCM 310A). The NCM 310A determines if a BN 205 is in the Broker Table 1000. The SN 200 also maintains a Broker Table 1000 for the transmission of the request packets. The BN advertisement handler 620A updates the Broker Table. If a BN 205 is present in the Broker Table, the request packet 1900 is also sent to the BN 205 by way of the message forwarding handler 1910. A copy of the packet is created with the appropriate Broker address and sent to the network layer in the network stack 1905. The outgoing request packet 1900A is send to the selected BN 205. The BN advertisement 660A is received by the network stacks 1905 and the network layer forwards the advertisement 660A to the BN advertisement handler 620A.

Figure 20:
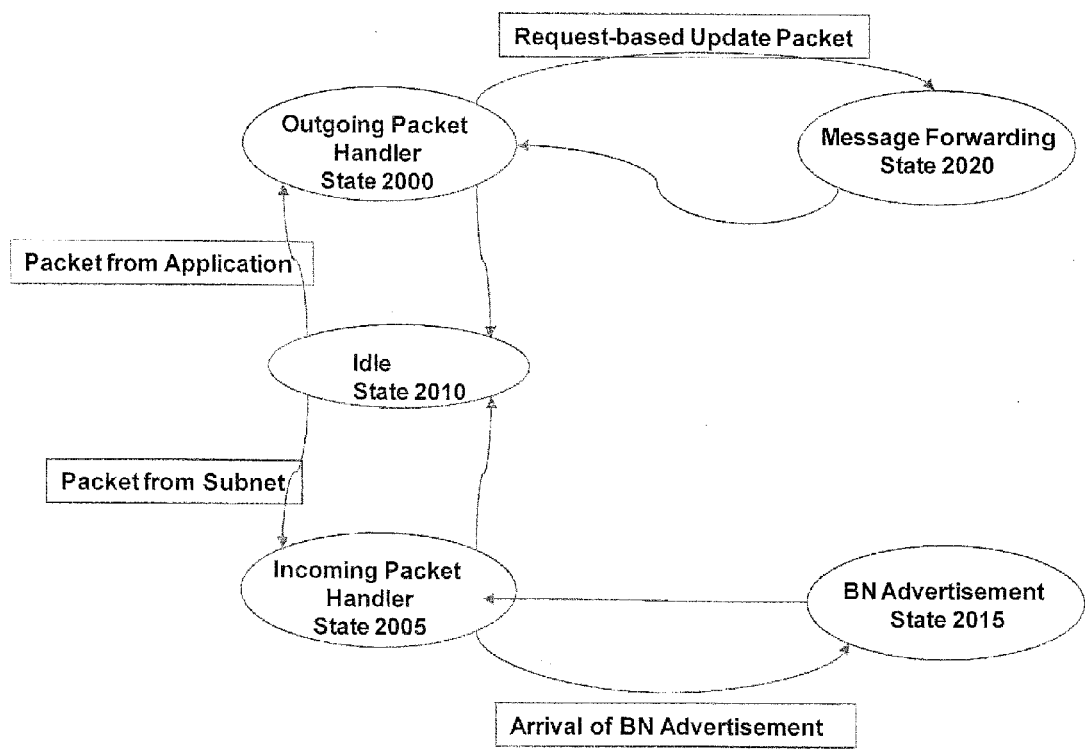
FIG. 20 illustrates a state diagram of the simple node for processing a request packet (source) in accordance with the invention.

FIG. 20 illustrates a state diagram of the SN 200 for processing a request packet (source). Initially, the SN 200 is in an idle state 2010. When a packet is received by the application layer, the SN 200 moves to an outgoing packet handler state 2000. If the packet is a request packet 1900, the SN moves into a message forwarding state 2020, i.e., determines BN and BN address (native address). Once the request packet 1900 is addressed the packet is returned to the outgoing packet hanger (state 2000) for transmission.

When a packet is received (from the native sub-net 15) the SN 200 moves from an idle state 2010 to an incoming packet handler state 2005. If the packet is a BN advertisement 660A, the SN 200 invokes the BN advertisement handler 620A (state 2015). The Broker Table 1000 is updated. Once updated, the SN 200 returns to an idle state 2010.

Figure 21:
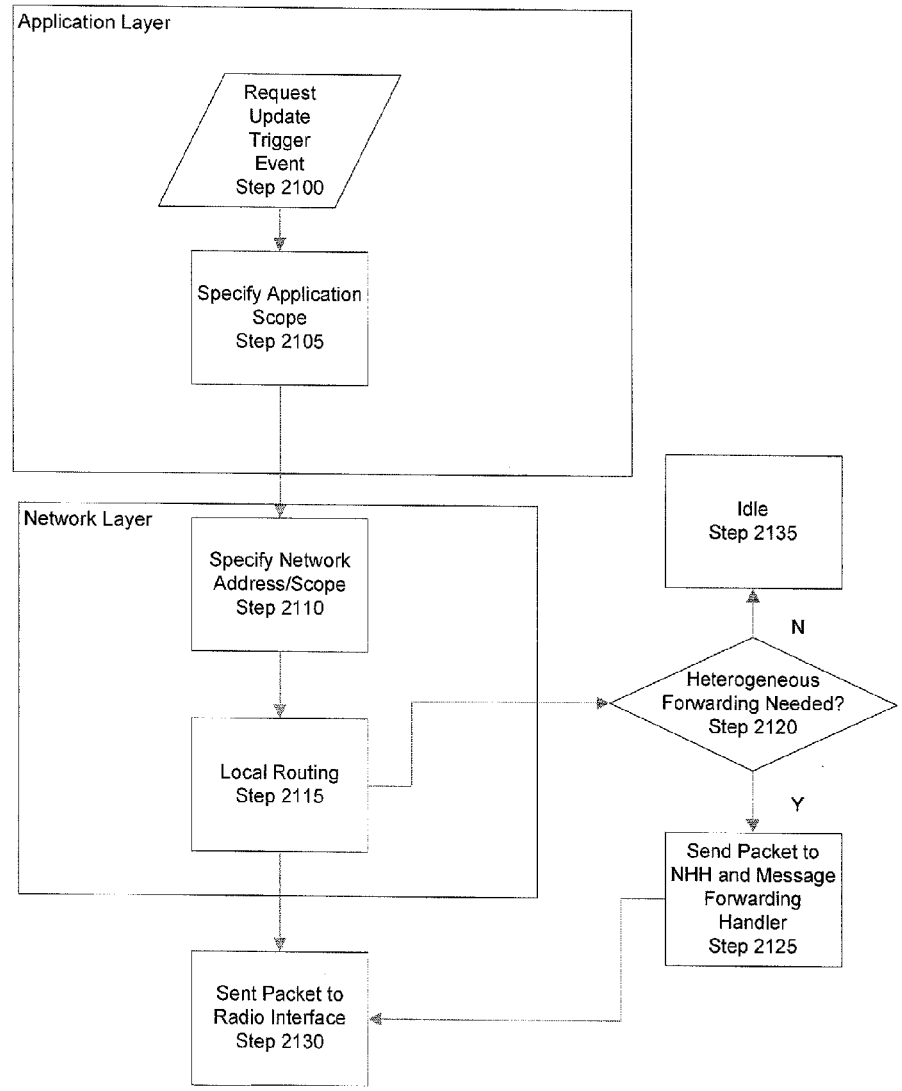
FIG. 21 illustrates a flow chart for the transmission of a request-based update packets by an simple node.

FIG. 21 illustrates a flow chart for the transmission of request-based update packets by an SN 200. Steps 2110-2120 are performed in the outgoing packet handler. At step 2100, a safety request-based update event is detected. The SN 200 determines a need for sending a request packet 1900, e.g., new map needed or new software update. At step 2105, the scope for the transmission of the message is set. The scope can be, but is not limited to, a region of interest, a maximum number of hops (TTL), and maximum relay time. The scope is network specific. The scope for a request packet 1900 is larger than both the scopes of the safety related packet and traffic update related packets. Steps 2100 and 2105 are performed by the application layer. Steps 2110 and 2115 are performed by the network layer. The application layer also appendix an application identifier to the packet and an application peer address for the destination.

Additionally, as noted above, the network layer converts the application scope into the network scope. The node includes a mapping or conversion table for enabling the conversion. At step 515, the local routing process is performed for the packet. The next hop towards destination is determined using local routing information. At step 2130, the payload and header (complete packet) is sent to the radio interface for transmission. In parallel with sending the sent to the packet interface for native forwarding, the SN 200 determines if heterogeneous forwarding is needed at step 2120. This determination is based upon the application identifier. Heterogeneous forwarding is used for certain application types. These application types are a preconfigured parameter. These application types can also be updated, adding new applications by identifier. If heterogeneous forwarding is needed ("Y" at step 2120), the packet is forwarded to the NHH 610A and the Message forwarding handler 1910. The NHH 610A selects the BN 205 for forwarding the request packet 1900.

Figure 22:
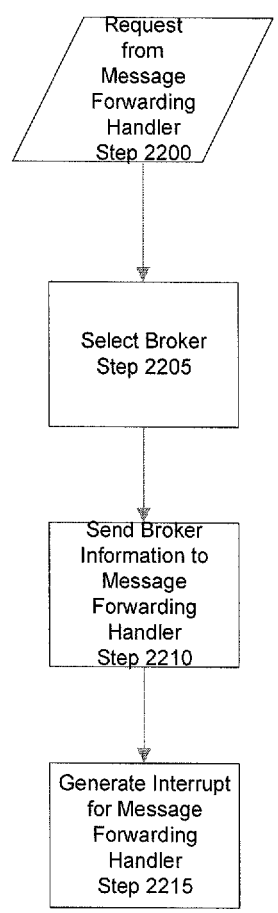
FIG. 22 illustrates a flow chart for the network heterogeneity handler in a simple node in accordance with the invention.

FIG. 22 illustrates a flow chart for the NHH 610A in a SN 200. At step 2200, the request packet 1900 is received from the Message forwarding handler 1910. The NHH 610A selected the BN 205 at step 2205. The SN 200 can use the same selection criterion as BN 205.

For example, a BN 205 having IP sub-net capability can be given a higher priority. Since, the destination server is likely an IP based server, giving a priority to an BN having IP sub-net capability increases the likelihood that the server will received the outgoing request packet 1900A. Additionally, if a BN is closer to the location of relevance of the packet (or location of the source), it can be selected since it would increase the likelihood that the packet reaches the entire region of relevance.

Additionally, the BN 205 can be selected based on the location of the relevance of the packet, location information for the available brokers, and the number of sub-nets that a broker is configured to communicate in. One or more of these factors can be combined to create a selection score. Each criterion can be assigned a value from 0 to 1. Each value is added to generate the selection score. The BN with the highest score is selected. Additionally, each factor can be weight. The value assigned to each criterion can be multiplied by the weight. The weighted values are added to generate the selection score. The BN with the highest weighted selection score is selected. Alternatively, all BNs 205 in the Broker Table 1000 can be selected.

The request packet 1900 is returned to the Message Forwarding Handler 1910 at step 2210 along with the addresses of each BN selected. Afterwards, the NHH 610A generates an internal interrupt to the Message Forwarding Handler at step 2215.

Figure 23:
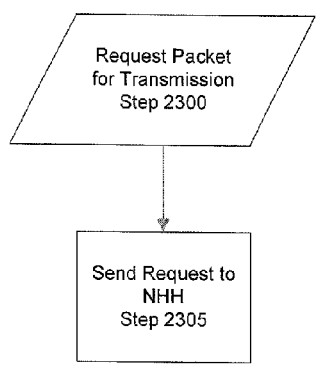
FIGS. 23 and 24 illustrate flow charts for the Message Forwarding Handler in the simple node in accordance with the invention.
Figure 24:
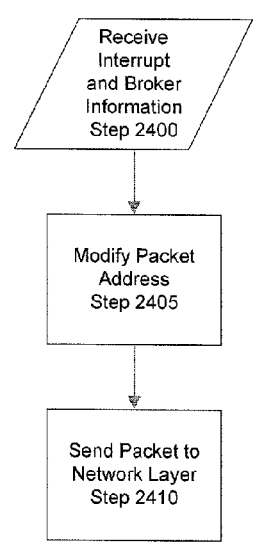

FIGS. 23 and 24 illustrate flow charts for the Message Forwarding Handler 1910. FIG. 23 illustrates the flow chart for processing a packet from the network stack and FIG. 24 illustrates a flow chart for processing the packet received from the NHH 610A.

At step 2300, the request packet 1900 is received from the network layer in the network stacks. This request packet 1900 is internally forwarded to the NHH 610A at step 2305. The Message Forwarding Handler 1910 generates an internal interrupt for the NHH 610A.

At step 2400, the request packet 1900 is received from the NHH 610A along with the routable addresses for the selected BN 205 and the interrupt. At step 2405, the Message Forwarding Hander modifies the packet field so that it is sent to the BN. The received broker address from the NHH 610A is used to modify the address field of the request packet 1900.

Thereafter, the packet is sent by the Message forwarding Handler back to the network stack (network layer) at step 2410. By modifying the request packet 1900 with the routable address of the BN, the outgoing request packet 1900A is routed to the BN as a unicast message.

Figure 25:
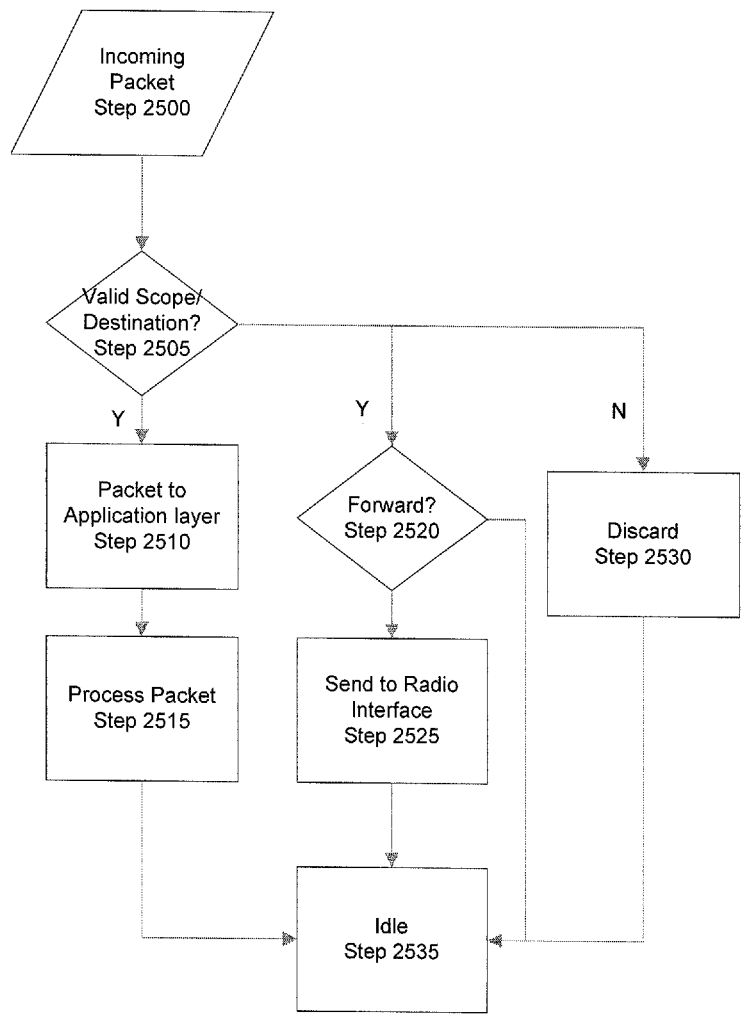
FIG. 25 illustrates a flow chart for intermediary simple node relaying request-based update packets in accordance with the invention.

FIG. 25 illustrates a flow chart for intermediary SN relaying the packet (outgoing request packet 1900A) to the selected BN. The intermediaries SN relay the packet to the selected BN using the underlying routing protocol of the home or native sub-net 15. At step 2500, the outgoing request packet 1900A is received by a SN 200. The SN 200 examines the destination address and the payload to determine the scope. If the destination is not available through the SN 200, it discards the packet at step 2530, i.e., if the destination cannot be directly reaches through a single hop or multiple hop. For example, if the destination is not included in a local routing table, the packet is discarded. Additionally, if the packet's transmission has already exceeded the scope, the packet is discarded at step 2530. For example, if the scope has a maximum allowable hop count of 10 and the packet has been relayed or forwarded 10 times, the packet is discarded.

Each time a packet is forwarded, the hop count in the packet is incremented. The hop count is compared with the maximum allowable hop count. Alternatively, the hop count is decreased by 1 from the maximum allowable hop count each time a packet is relayed or forwarded. When the hop count is zero, the packet is discarded.

If the packet destination is valid and within the scope, a determination is made if it needed to be forwarded, i.e., the node is not the destination at step 2520. If the outgoing request packet 1900A needed to be forwarded ("Y" at step 2520), the outgoing request packet 1900A is sent to the radio interface at step 2525 for transmission, i.e., packet is relayed. Afterwards, the SN 200 returns to an idle state at step 2535. In parallel with the determination of forwarding, the outgoing request packet 1900A is forwarded internally to the application layer for processing at step 2510 and processed at step 2515.

Figure 26:
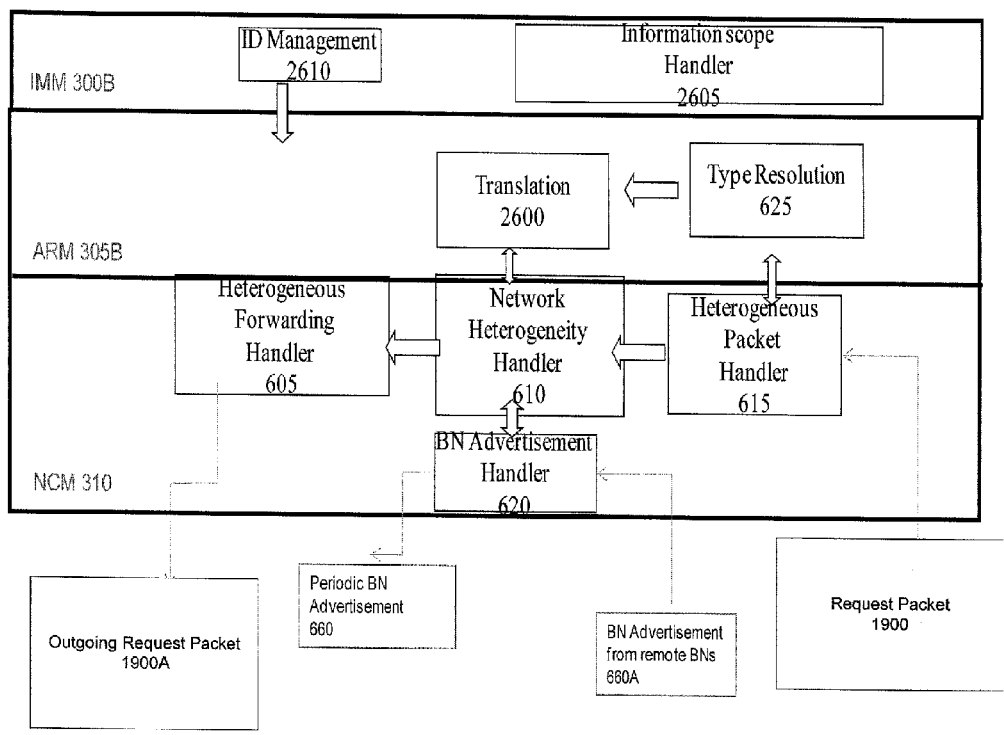
FIG. 26 illustrates module diagram for request-base update packet processing in the broker node for supporting request-based update packets in accordance with the invention.

FIG. 26 illustrates module diagram for request-base update packet processing in the BN 205. The RMC 315 is not depicted. The diagram illustrates various functions (handlers or sections) that comprise the module of the coordination plane. The functions in each module interact within a module and across different modules. FIG. 26 is similar to FIG. 6. Many of the handlers depicted in FIGS. 6 and 26, respectively are the same and therefore, will not be described in detail again. FIG. 26 include IMM 300B and ARM 305B (the use of "B" after the reference number highlights the handlers and sections are added to the modules depicted in FIG. 6).

The ARM 305B includes a translation 2600 section.

The IMM 300B includes an ID Management section 2610 and an Information Scope Handler 2605. The IMM 300B collects node ID including routable addresses; communication preferences and application peer address. The ID Management section 2610 is a centralized ID registration where nodes can register. This information is fed to the translation 2600 in the ARM 305B to translate the application peer address into a routable address (native or local address). The Routable address(es) are sent to the network coordination module.

The Information Scope Handler 2605 determines need of a message to propagate to heterogeneous networks.

Figure 27:
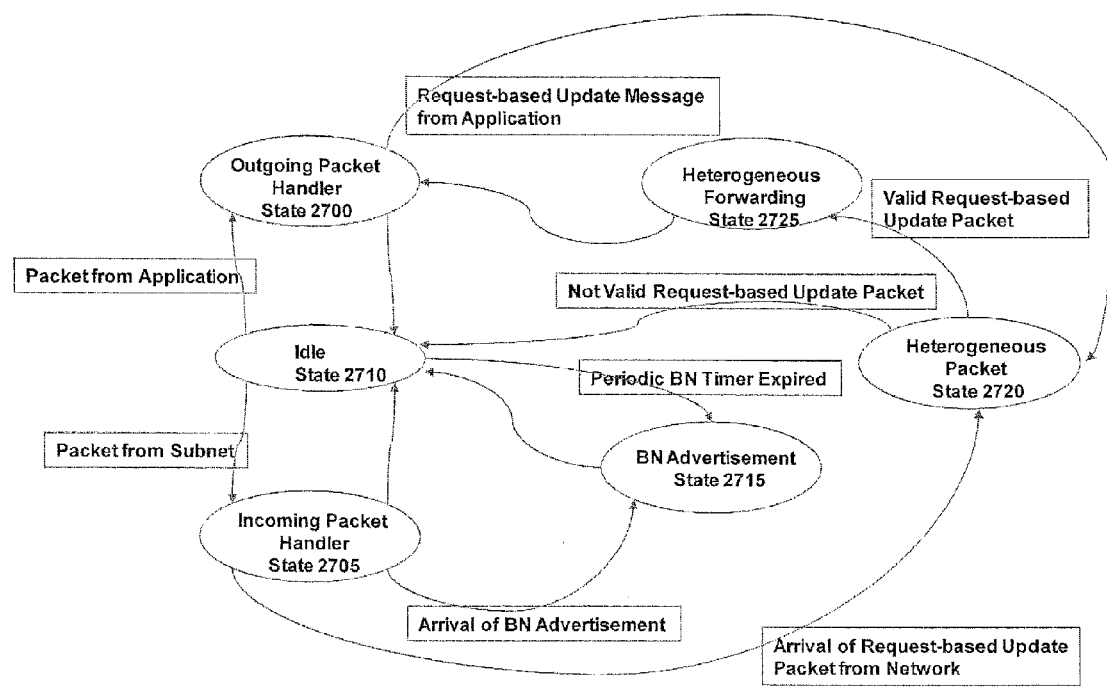
FIG. 27 illustrates a state machine for the broker node with respect to request-based update packets processing in accordance with the invention.

FIG. 27 illustrates a state machine for the BN 205 with respect to request-based update packets processing. FIG. 27 is similar to FIGS. 7 and 16 (request-based update verses traffic update verses safety). The following description of FIG. 27 is to highlight the difference between the packet processing of a request-based update packets (request packets 1900A), traffic update related packet and a safety related packet. The main different is that a request-based update packets are unicast packets addressed to a specific destination as opposed to a broadcast packet, and therefore, there is a high likelihood of multiple BNs relaying the packet. Therefore, coordination between multiple BNs 205 is required to support request-based update packets. When in an idle state 2710, if a packet is received from the application, the BN 205 moves to the outgoing packet handler state 2700. Once the packet is process and is sent, the BN 205 returns to an idle state 2710. When in an idle state 2710, if a packet is received from another node, e.g., from a sub-net 15, the BN 205 moves to the incoming packet handler state 2705. Additionally, when in an idle state 1610, if a timer expires, a BN advertisement 660 is triggered at step 1615 (BN Advisement Handler 620). The periodic time for transmitting a BN advertisement is less than the periodic time for transmitting the BN advertisement for the safety related applications. This is because coordination between BNs is needed for maintaining connectivity and routes between BNs. The updating of the routing information needs to be quicker than for the safety related applications. Once the BN advertisement is transmitted, the BN 205 returns to the idle state 2710.

If the packet received from the sub-net 15 is a request-based update packet, the BN moves state 720 to determine if the packet needed to be forward heterogeneously (invokes the HPH 615 and Information Scope Handler 2605). The HPH 615 and the Information Scope Handler 2605 examines the application identifier and the scope. If the packet is not a valid request-based update packet, the BN 205 returns to an idle state 2710. If the packet is a valid request-based update packet, the BN 205 moves to the heterogeneous forwarding state 2725 (invokes the heterogeneous forwarding handler 605 the NHH 610, translation 2600, ID management 2610 and the type resolution 625). The NHH 610 selects the appropriate another BN for forwarding. An additional BN is needed if the destination cannot be reached by the BN 205, e.g., not in configured sub-net or not in routing table. However, if the destination can be reached without an additional BN, the application peer address is translated by the translation 2600 into a routable address. The request packet 1900 and the routable address are internally forwarded to the HFH 605.

When the BNs 205 application layer generates its own packet (non BN advertisement), the BN 205 moves from the idle state 2710 to the outgoing packet handler state 2700. If the packet is a request-based update packets, the BN 205 moves to state 2720 (invokes the HPH 615 and Information Scope Handler 2605). Upon receiving a data packet, the HPH 615 and Information Scope Handler 2605 (at state 2720) check the scope and network address of the packet to verify for further heterogeneous forwarding process. If the packet is not a request-based update packet, the BN 205 returns to an idle state 1610. If the packet is a valid packet, the BN 205 moves to the heterogeneous forwarding state 1625 (invokes the heterogeneous forwarding handler 605, the NHH 610, the translation 2600 and ID Management 2610 and the type resolution 625).

The NHH 610 selects the appropriate another BN for forwarding. An additional BN is needed if the destination cannot be reached by the BN 205, e.g., not in configured sub-net or not in routing table. However, if the destination can be reached without an additional BN, the application peer address is translated by the translation 2600 into a routable address. The request packet 1900 and the routable address are internally forwarded to the HFH 605.

The phrase idle state 2710 as used in FIG. 27 refers to not performing the functionality described in the other states. However, the node can be performing other processes described herein.

The EN advertisement handler 620 broadcasts a BN advertisement 660 (660A). FIG. 8 illustrates an exemplary BN advertisement 660 (660A) that can be used to coordinate and maintain connectivity between BN 205 as well as inform the SNs 200 of the BN. The BN advertisement 660 (660A) includes a message type identifier, BN identifier, a sub-network specific routable address, a list of sub-networks that the BN is configured to communicate and a status identifier. The status identifier indicates that the node is a BN 205. The BN advertisement 660 (660A) is broadcast to each sub-network that the BN 205 is capable of communication, i.e., each sub-network that the BN is configured with a protocol for. The BN advertisement 660 (660A) is broadcast using a broadcast routable address specific to the sub-network. Each sub-network has a dedicated routable address for broadcasting. For request-based update packets, the location information should be included. Additionally, the other field should include Broker specific information such as mobility characteristics, other associated brokers etc. The additional information is used to update the Broker Table 1000 and used by the NHH 610 to determine the BNs.

The Broker Table is generated in the same manner as described in FIG. 18 and therefore will not be described in detail again.

Figure 28:
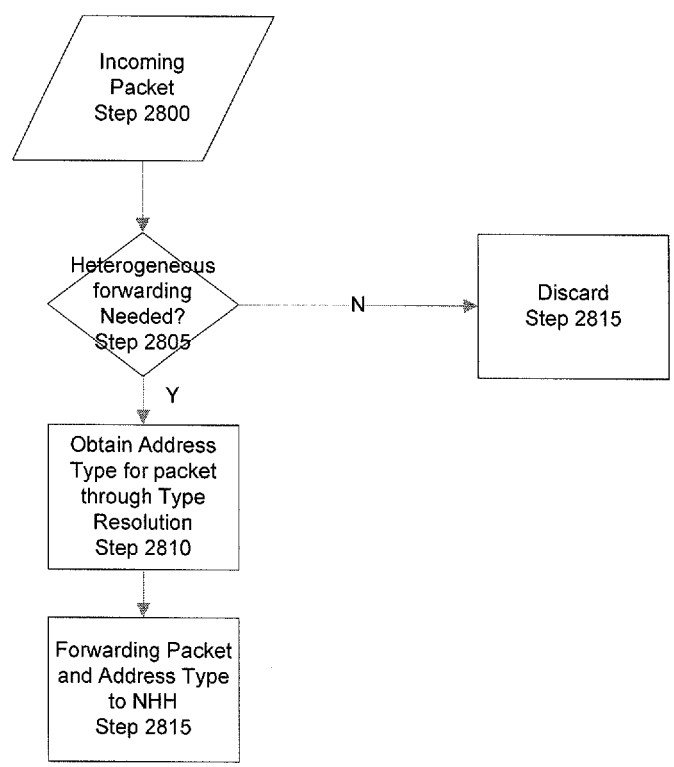
FIG. 28 illustrates a flow chart for the heterogeneous packet handler in the broker node with respect to request-based update packets processing in accordance with the invention.

FIG. 28 illustrates a flow chart for the HPH 615. At step 2800, a request packet 1900 is received by the HPH 615. At step 1105, the HPH 615 determines if heterogeneous forwarded is needed. The determination is based upon the application identifier in the packet. Alternatively, the packet can include a flag indicative of heterogeneous forwarding. If the application identifier corresponds to a request-based update application, the packet 1900 can be heterogeneously forwarded. If no heterogeneous forwarding is needed, the HPH 615 discards the packet at step 2815. Step 2815 uses the phrase "discards the packet". This only refers to discarding the packet by the HPH 615. At step 2810, the address type for the packet is obtained. The "Type Resolution" 625 obtains the address type for the target network. The target network is the network associated with the server. For request based updates, the request packets are usually sent to an IP-based network. The target address type is used by the NHH 610 to selected at least one BN 205 that will enable the eventual reception of the request packet 1900A by the server in the IP-based network. Different application can have specific rules regarding to the types of addresses that are relevant, i.e., target address type. The Type resolution 625 enable streamlines of the target address type based upon the application. The type of application is determined by the application identifier.

The request packet 1900 and the address type are then internally forwarded to the NHH 610 at step 2815.

Figure 29:
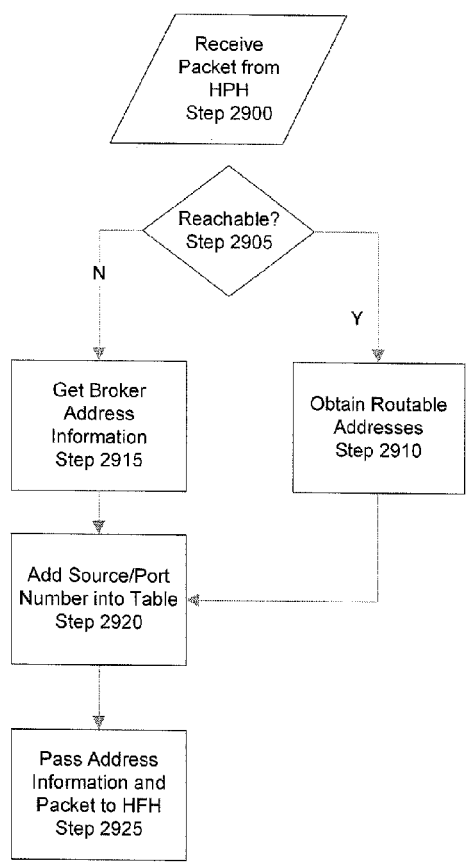
FIGS. 29 and 30 illustrate flow charts for the network heterogeneity handler in the broker node with respect to request-based update packets processing in accordance with the invention.
Figure 30:
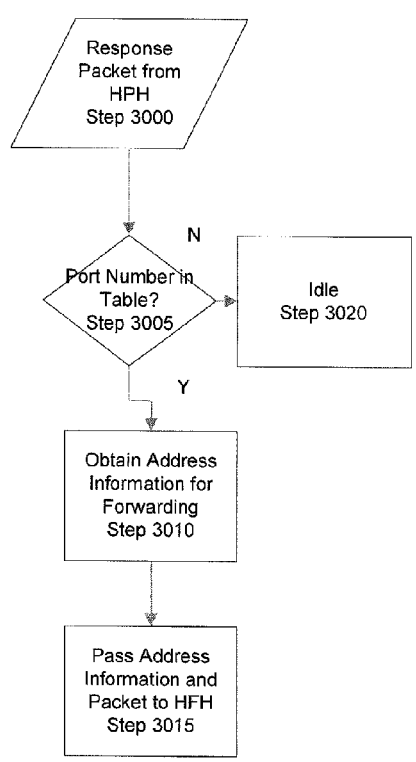

FIGS. 29 and 30 illustrate flow charts for the NHH 610. The NHH 610 also performs the step in FIG. 18. FIG. 29 illustrates the flow chart for forwarding the request packet 1900. FIG. 30 illustrates the method for relaying the response packet back to the requester.

When the request packet is received from the HPH 615 (step 2900), the NHH 610 determines whether the destination can be reached using one of its sub-nets at step 2905. This determination is based upon the address type received from the HPH 615 and local routing information for each of the sub-net 15n that the BN 205 is configured to communicate. In particular, each node (SN 200 and 205) maintain local routing information (in accordance with the sub-net local routing protocol) for the corresponding sub-net. For example, the BN 205 maintains a local routing table with all next hop information to destinations within the sub-net 15 and corresponding destinations. If the destination is listed in any of its local routing tables, then the BN 205 can communicate with the destination without the need of another BN.

If the BN has the sub-net protocol to communicate with the destination, e.g., IF protocol for the IP server ("Y" at step 2905), the translation 2600 translates the application peer address(es) of the servers into a routable address(es) for the destination(s). The translation will be performed in conjunction with the local route protocol. The routable addresses are passed to the NHH 610 at step 2910. Once the address(es) is/are translated, network specific routable address(es) for the destination(s) is/are replaced in the route for the unicast, (point to point or multi-point) packet and route to the next hop to destination by the HFH 605.

If the BN 205 is not able to communicate with the destination because it does not have the appropriate protocol ("N" at step 2905), the NHH 610 selects a different BN to forward the outgoing request packet 1900A to the destination, e.g., IP server at step 2915. In this case, the routable address for the BN is replaced into the outgoing request packet 1900A by the HFH 605. The routable address can be any overlapping address that both BNs are configured to communicate in, e.g., LPG or Geo address. For example, the routable address information is retrieved from the Broker Table 1000.

The selection of a BN 205 has been described above and will not be described in detail again. At step 2910, the NHH 610 adds the requester's routable address and port number into an active path routing table 3100 (referenced in FIG. 31). This information is used for the return route, i.e., relaying the response packet back to the requesting node. FIG. 31 illustrates an exemplary active path routing table 3100. Each BN 205 maintains the active path routing table 3100. The first column includes a list of source address. The source address is the direct link source. In other words, the immediate previous hop node. In the case of multiple BNs 205 forwarding or relaying the packet, the source address is the previous hop BN or the original source node. The second column is the port number. As noted above, each BN tracks the neighboring BN address and the port number when forwarding the request packet 1900A. This way the BN 205 knows the target address when the response packet is received from the server. The response packet is transmitted using the reverse path, i.e., symmetric.

If selects a BN 205 (if it is not able to communicate with the destination using the destination routing protocol), the packet is further relayed to additional BNs until a BN 205 can communicate with the destination, either via a single hop or a multiple hop, i.e., via the sub-net of the destination server.

For the reverse path, the response packet is received by the NHH 610 from the HPH 615 at step 3000. The active path routing table is consulted to determine if the port number is in the table at step 2005. If the port number is in the table, the BN forwarded the outgoing request packet 1900A towards the destination server. At step 3010, the NHH 610 obtains the address information for the next hop towards the requesting node from the first column of the active path routing table that corresponds to the port number. At step 3015, the address information and packet is forwarded to the HFH 605. The HFH 605 modifies the packet to include the next hop information received from the NHH 610 and the response packet is forwarded towards the requesting node. If the port is not in the active path routing table, the NHH 610 returns to an idle state.

The response packet is similarly forward through multiple BNs 205 (likely the same BN) until the packet is received by the BN that is in the requesting nodes native sub-net. Once the native BN, i.e., BN in the native sub-net receives the packet, the response packet is relayed to the requesting node using the local routing protocol for the native sub-net. The response packet includes the requested update.

The ID management 2610 collects application peer identifier and its corresponding routable addresses. Periodically, the BN 205 receives information related to applications that are currently running on a SN 200. This information includes all application peer identifiers corresponding to the currently running applications. The Id management 2610 extracts the application peer identifiers; the application identifier and the routable address and creates a table having this information. This table is used by the translation 2600 to determine the local routable address for a given application peer identifier. The SN 200 can periodically transmit this message without the BN 205 requesting the information. Alternatively, the BN 205 can actively request the application peer identifiers, application identifiers and routable addresses.

This information is sent via a packet. This packet is relayed to the BN 205. When the BN receives this packet is knows the routing path the packet took from the transmitting node, e.g. multi-hop path. Therefore, it will know the next hop to destination. Additionally, as part of the routing protocol, the BN 205 receives routing information including information related to the next hop to destinations within the sub-net. Both sets of information are used to determine the local routable address and the next hop to destination to send the request packet 1900A and the response packet.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as "modules" or "system."

Various aspects of the present disclosure may be embodied as a program, software, or computer instructions embodied or stored in a computer or machine usable or readable medium, which causes the computer or machine to perform the steps of the method when executed on the computer, processor, and/or machine. A computer readable medium, tangibly embodying a program of instructions executable by the machine to perform various functionalities and methods described in the present disclosure is also provided.

The nodes, system and method of the present disclosure may be implemented and run on a general-purpose computer or special-purpose computer system. The computer system may be any type of known or will be known systems such as, but not limited to, a virtual computer system and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "nodes" and "network" as may be used in the present disclosure may include a variety of combinations of fixed and/or portable computer hardware, software, peripherals, and storage devices. The system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The above description provides illustrative examples and it should not be construed that the present invention is limited to these particular examples. Thus, various changes and modifications may be effected by one skilled in the art without departing from the spirit or scope of the invention as defined in the appended claims.

What is claimed is:

1. An open communication method between at least two sub-networks, where each of the at least one sub-networks has a different routable network addressing scheme comprising:
   receiving a packet for a specific application, the packet including an application identifier, where a node generating the packet is configured to communicate using a first of said at least two sub-networks;
   determining if the packet is to be relayed to another of the at least two sub-network based upon the application identifier;
   determining if a node receiving the packet is a broker node, where a broker node is configured for communicating using at least two of the at least two sub-network via a corresponding routable network addressing schemes for each of the sub-networks;
   relaying the packet to a broker node if not a broker node;
   forwarding, by the broker node, the packet to at least one node in another of the at least two sub-network;
   determining, by a broker node, a relay scope for the packet based upon information in the packet; and
   broadcasting, by the broker node, the packet to each of the at least two sub-networks if the relay scope has not be reached;
   wherein the application is an emergency service message.

2. An open communication method between at least two sub-networks, where each of the at least one sub-networks has a different routable network addressing scheme comprising:
   receiving a packet for a specific application, the packet including an application identifier, where a node generating the packet is configured to communicate using a first of said at least two sub-networks;
   determining if the packet is to be relayed to another of the at least two sub-network based upon the application identifier;
   determining if a node receiving the packet is a broker node, where a broker node is configured for communicating using at least two of the at least two sub-network via a corresponding mutable network addressing schemes for each of the sub-networks;
   relaying the packet to a broker node if not a broker node;

forwarding, by the broker node, the packet to at least one node in another of the at least two sub-network;

broadcasting a status packet from a broker node to each sub-network that the broker node is configured to communicate;

receiving the status packet from the broker node;

updating a broker table using information from the status packet;

determining, by a broker node, a relay scope for the packet based upon information in the packet;

broadcasting, by the broker node, the packet to each of the at least two sub-networks if the relay scope has not been reached; and forwarding the packet to another broker node to distribute the packet to other sub-networks that the broker node is not configured for communication, the another broker node is determined based upon the broker table;

wherein the application is a traffic update message.

3. The open communication method according to claim 2, further comprising:

selecting the another broker node, wherein the selection is based at least upon a number of sub-networks each broker node in the broker table is configured to communicate.

4. The open communication method according to claim 2, further comprising:

selecting the another broker node, wherein the selection is based at least upon a location of each broker node in the broker table.

5. The open communication method according to claim 2, further comprising:

selecting the another broker node, wherein the selection is based at least upon a type of sub-network each broker node in the broker table is configured to communicate, where each type of sub-network is assigned a priority.

6. An on-demand open communication method between at least two sub-networks, where each of the at least one sub-networks has a different mutable network addressing scheme comprising:

receiving a request packet for an update by a requesting node, the request packet including an application peer identifier for a destination node of the request packet and an application identifier unique to an application and a routable network address for a selected broker node;

determining if the request packet is to be relayed to another of the at least two sub-network based upon the application identifier; and determining if the selected broker node is configured to communicate using a routable network addressing scheme for a sub-network corresponding with the destination node based upon the application peer identifier based upon local routing information, if the selected broker is not configured to communicate using the routable network addressing scheme for the sub-network corresponding with the destination node, the method further comprises:

selecting another broker node for relaying the request packet to the destination node, wherein another broker node is repeatedly selected by each subsequent broker node until the request packet reaches the sub-network corresponding with the destination node;

relaying the request packet to the another broker node; and recording a routable network address for a broker node that transmitted the request packet for each subsequent broker node and a corresponding outgoing port number in an active path routing table, wherein the active path routing table is used for routing the update in a reverse direction back to the requesting node.

7. The on-demand open communication method according to claim 6, further comprising:

receiving the update from the destination node;

determining if the outgoing port number is in the active path routing table;

obtaining an address correspond to the outgoing port number; and relaying the update to a node corresponding to the address.

8. The on-demand open communication method according to claim 7, further comprising:

receiving the update from the node;

determining if the outgoing port number is in the active path routing table;

obtaining an address correspond to the outgoing port number; and relaying the update to a node corresponding to the address, wherein the update is repeatedly relayed to nodes until the update reaches the sub-network corresponding with the requesting node.

9. The on-demand open communication method according to claim 7, further comprising:

relaying the update to the requesting node by a broker node in the sub-network corresponding with the requesting node.

10. An on-demand open communication method between at least two sub-networks, where each of the at least one sub-networks has a different routable network addressing scheme comprising:

receiving a request packet for an update by a requesting node, the request packet including an application peer identifier for a destination node of the request packet and an application identifier unique to an application and a routable network address for a selected broker node;

determining if the request packet is to be relayed to another of the at least two sub-network based upon the application identifier;

determining if the selected broker node is configured to communicate using a routable network addressing scheme for a sub-network corresponding with the destination node based upon the application peer identifier based upon local routing information, if the selected broker is not configured to communicate using the mutable network addressing scheme for the sub-network corresponding with the destination node, the method further comprises:

selecting another broker node for relaying the request packet to the destination node, wherein another broker node is repeatedly selected by each subsequent broker node until the request packet reaches the sub-network corresponding with the destination node; and relaying the request packet to the another broker node;

wherein the local routing information is generated by receiving packets from each node within a sub-network that a broker node is configured to communicate, the received packets including a local routable address and its corresponding application peer address for all applications that are currently active in each node, and a local routing path to get to each node.

11. The on-demand open communication method according to claim 10, further comprising:

generating a local routing table using information from the received packets, the local routing table including a local routable address and its corresponding application peer address for all applications that are currently active in each node and the local routing path.

12. An on-demand open communication method between at least two sub-networks, where each of the at least one sub-networks has a different mutable network addressing scheme comprising:
receiving a request packet for an update by a requesting node, the request packet including an application peer identifier for a destination node of the request packet and an application identifier unique to an application and a routable network address for a selected broker node;
determining if the request packet is to be relayed to another of the at least two sub-network based upon the application identifier; and
determining if the selected broker node is configured to communicate using a routable network addressing scheme for a sub-network corresponding with the destination node based upon the application peer identifier based upon local routing information,
if the selected broker is not configured to communicate using the routable network addressing scheme for the sub-network corresponding with the destination node, the method further comprises:
selecting another broker node for relaying the request packet to the destination node, wherein another broker node is repeatedly selected by each subsequent broker node until the request packet reaches the sub-network corresponding with the destination node; relaying the request packet to the another broker node; and
broadcasting a status packet from a broker node to each sub-network that the broker node is configured to communicate, the status packet including a list of sub-networks that the broker node is configured to communication and its current location and its routable address for each of the sub-networks.

13. The on-demand open communication method according to claim 12, further comprising:
receiving the status packet from the broker node; and
updating a broker table using information from the status packet.

14. The on-demand open communication method according to claim 13, wherein the broker node is selected based at least upon a type of sub-network each broker node in the broker table is configured to communicate, where each type of sub-network is assigned a priority.

15. The on-demand open communication method according to claim 14, wherein an IP sub-network is assigned a highest priority.

* * * * *

UNITED STATES PATENT AND TRADEMARK OFFICE
CERTIFICATE OF CORRECTION

PATENT NO.         : 8,792,492 B2                                  Page 1 of 2
APPLICATION NO.    : 13/275057
DATED              : July 29, 2014
INVENTOR(S)        : Chen et al.

It is certified that error appears in the above-identified patent and that said Letters Patent is hereby corrected as shown below:

In the Specification

In Column 1, Line 55, delete "deter mining" and insert -- determining --, therefor.

In Column 6, Line 65, delete "mutable" and insert -- routable --, therefor.

In Column 7, Line 64, delete "Advisement" and insert -- Advertisement --, therefor.

In Column 8, Line 15, delete "Advisement" and insert -- Advertisement --, therefor.

In Column 12, Line 24, delete "different" and insert -- difference --, therefor.

In Column 12, Line 35, delete "Advisement" and insert -- Advertisement --, therefor.

In Column 13, Line 3, delete "state" and insert -- state. --, therefor.

In Column 13, Line 29, delete "advisement" and insert -- advertisement --, therefor.

In Column 14, Line 40, delete "BN" and insert -- BN. --, therefor.

In Column 14, Line 59, delete "sub-nets 15n" and insert -- sub-nets $15_n$ --, therefor.

In Column 17, Line 44, delete "addresses;" and insert -- addresses, --, therefor.

In Column 17, Line 61, delete "different" and insert -- difference --, therefor.

In Column 18, Line 7, delete "Advisement" and insert -- Advertisement --, therefor.

In Column 18, Line 62, delete "EN advertisement" and insert -- BN advertisement --, therefor.

Signed and Sealed this
Twenty-sixth Day of May, 2015

Michelle K. Lee
*Director of the United States Patent and Trademark Office*

CERTIFICATE OF CORRECTION (continued)
U.S. Pat. No. 8,792,492 B2

In Column 19, Line 66, delete "IF protocol" and insert -- IP protocol --, therefor.

In the Claims

In Column 22, Line 65, in Claim 2, delete "mutable" and insert -- routable --, therefor.

In Column 23, Line 39, in Claim 6, delete "mutable" and insert -- routable --, therefor.

In Column 24, Line 45, in Claim 10, delete "mutable" and insert -- routable --, therefor.

In Column 25, Line 3, in Claim 12, delete "mutable" and insert -- routable --, therefor.